(12) United States Patent
Voecks

(10) Patent No.: US 7,845,087 B2
(45) Date of Patent: Dec. 7, 2010

(54) APPARATUS AND METHOD FOR MEASURING AND CONTROLLING PENDULUM MOTION

(76) Inventor: Larry A. Voecks, 22273 Prospect St., Hayward, CA (US) 94541

( * ) Notice: Subject to any disclaimer, the term of this patent is extended or adjusted under 35 U.S.C. 154(b) by 23 days.

(21) Appl. No.: 12/217,869

(22) Filed: Jul. 8, 2008

(65) Prior Publication Data

US 2008/0271329 A1    Nov. 6, 2008

Related U.S. Application Data

(63) Continuation-in-part of application No. 11/582,904, filed on Oct. 17, 2006, now Pat. No. 7,395,605, which is a continuation of application No. 10/802,301, filed on Mar. 16, 2004, now Pat. No. 7,121,012, which is a continuation-in-part of application No. 09/461,706, filed on Dec. 14, 1999, now abandoned.

(51) Int. Cl.
*B66C 13/06* (2006.01)
*B66C 13/22* (2006.01)
*G01C 9/00* (2006.01)

(52) U.S. Cl. .............................. 33/391; 33/345; 212/273

(58) Field of Classification Search .................. 33/308, 33/313, 345, 351, 353, 391, 398, 399, 400, 33/401, 402; 212/270, 272, 273, 275
See application file for complete search history.

(56) References Cited

U.S. PATENT DOCUMENTS

| | | | |
|---|---|---|---|
| 2,933,821 A | 4/1960 | d'Enis | |
| 3,107,796 A | 10/1963 | Eisele | |
| 3,536,350 A | 10/1970 | Backteman | |
| 3,600,954 A | 8/1971 | Clarke | |
| 3,899,083 A | 8/1975 | Flessner et al. | |
| 3,921,818 A | 11/1975 | Yamagishi | |
| 3,936,197 A | 2/1976 | Aldrink et al. | |
| 4,254,334 A | 3/1981 | Baud | |
| 4,471,877 A | 9/1984 | Whitly | |
| 4,512,711 A | 4/1985 | Ling et al. | |
| 4,667,413 A | 5/1987 | Pitts | |
| 4,687,110 A | 8/1987 | Partanen et al. | |
| 4,700,479 A | 10/1987 | Saito et al. | |
| 4,756,432 A | 7/1988 | Kawashima et al. | |
| 4,811,492 A | 3/1989 | Kakuta et al. | |

(Continued)

FOREIGN PATENT DOCUMENTS

DE             254930         3/1988

(Continued)

*Primary Examiner*—R. A. Smith
(74) *Attorney, Agent, or Firm*—GSS Law Group

(57) ABSTRACT

A magnetically damped inclinometer has a shaft with attached pendulum that rotates. The rotation causes an index member to rotate past one or a set of magnets or electromagnets that are connected to the load. The magnet or electromagnet may be mounted directly to the load or it may be in the form of an off center ring. Another embodiment uses a spring to bias two magnets apart. A cam is attached to the shaft such that, as the pendulum and shaft rotate, a roller connected with the load or spreader bar allows the spring to push the magnets farther apart. The damped inclinometers are used to determine and provide information to respond to the initial sway of a load prior to bringing the load to a stop.

23 Claims, 25 Drawing Sheets

U.S. PATENT DOCUMENTS

| | | | |
|---|---|---|---|
| 4,997,095 | A | 3/1991 | Jones et al. |
| 5,048,703 | A | 9/1991 | Tax et al. |
| 5,089,972 | A | 2/1992 | Nachman et al. |
| 5,113,767 | A | 5/1992 | Theurer |
| 5,117,992 | A | 6/1992 | Simkus, Jr. et al. |
| 5,127,533 | A | 7/1992 | Virkkunen |
| 5,134,883 | A | 8/1992 | Shannon |
| 5,142,658 | A | 8/1992 | McMorran et al. |
| 5,143,232 | A | 9/1992 | Stewart et al. |
| 5,152,408 | A | 10/1992 | Tax et al. |
| 5,186,049 | A | 2/1993 | Shannon |
| 5,219,420 | A | 6/1993 | Kiiski et al. |
| 5,263,597 | A | 11/1993 | Stewart et al. |
| 5,443,566 | A | 8/1995 | Rushmer |
| 5,491,549 | A | 2/1996 | Wichner et al. |
| 5,526,946 | A | 6/1996 | Overton |
| 5,550,733 | A | 8/1996 | Yun et al. |
| 5,673,491 | A | 10/1997 | Brenna et al. |
| 5,713,477 | A | 2/1998 | Wallace |
| 5,729,339 | A | 3/1998 | Park et al. |
| 5,729,453 | A | 3/1998 | Lee et al. |
| 5,785,191 | A | 7/1998 | Fedema et al. |
| 5,802,728 | A | 9/1998 | Karnick et al. |
| 5,806,696 | A | 9/1998 | Hytonen |
| 5,813,124 | A | 9/1998 | Freitag |
| 5,908,122 | A | 6/1999 | Robinett et al. |
| 5,909,817 | A | 6/1999 | Wallace |
| 6,050,429 | A | 4/2000 | Habisohn |
| 6,126,023 | A | 10/2000 | Durrant-Whyte et al. |
| 6,182,843 | B1 | 2/2001 | Tax et al. |
| 6,499,220 | B2 | 12/2002 | Katsuki et al. |
| 7,121,012 | B2 | 10/2006 | Voecks |
| 7,395,605 | B2 | 7/2008 | Voecks |
| 2002/0033052 | A1 | 3/2002 | Kondo |
| 2008/0023431 | A1* | 1/2008 | Recktenwald et al. ....... 212/273 |

FOREIGN PATENT DOCUMENTS

| | | |
|---|---|---|
| DE | 19 614 248 | 10/1997 |
| DE | 10042699 A1 | 4/2002 |
| EP | 841296 | 5/1998 |
| FR | 2775678 | 9/1999 |
| GB | 2195775 | 4/1988 |
| GB | 2294028 A | 4/1996 |
| JP | 63-225118 | 9/1988 |
| JP | 01317993 A | 12/1989 |
| JP | 02028493 A | 1/1990 |
| JP | 2-175592 | 7/1990 |
| JP | 03056394 A | 3/1991 |
| JP | 03056395 A | 3/1991 |
| JP | 7-71958 | 3/1995 |
| JP | 8-40688 | 2/1996 |
| JP | 8-143272 | 4/1996 |
| JP | 9-301677 | 11/1997 |
| JP | 10-17270 | 1/1998 |
| JP | 10139370 A | 5/1998 |
| JP | 10236767 A | 9/1998 |
| JP | 11-49479 | 2/1999 |
| JP | 2000095477 A | 4/2000 |
| JP | 2000143147 A | 5/2000 |
| JP | 2004091062 A * | 3/2004 |

* cited by examiner

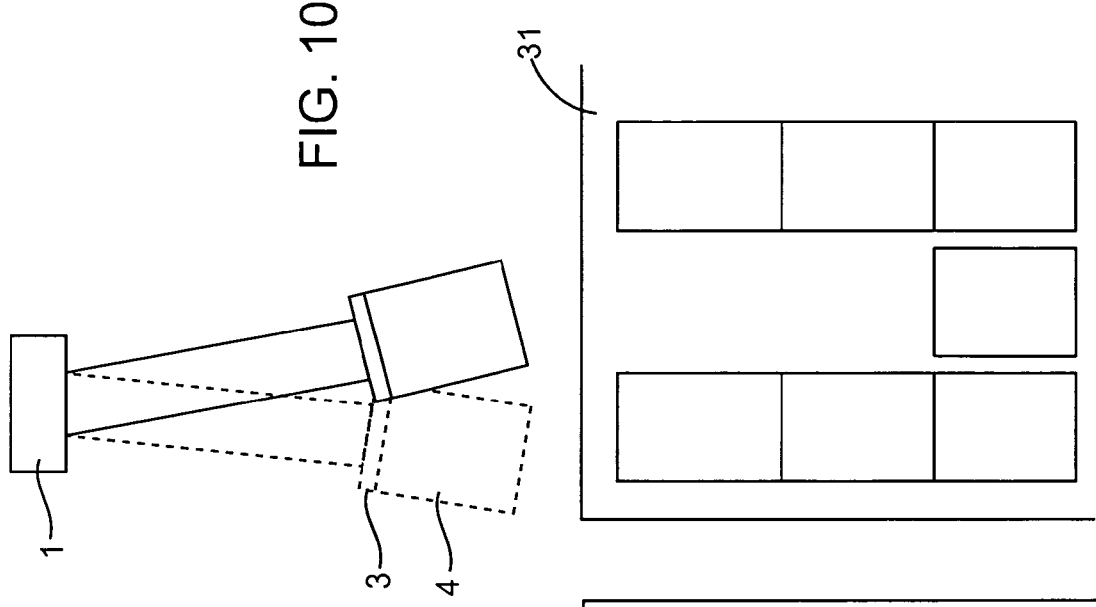
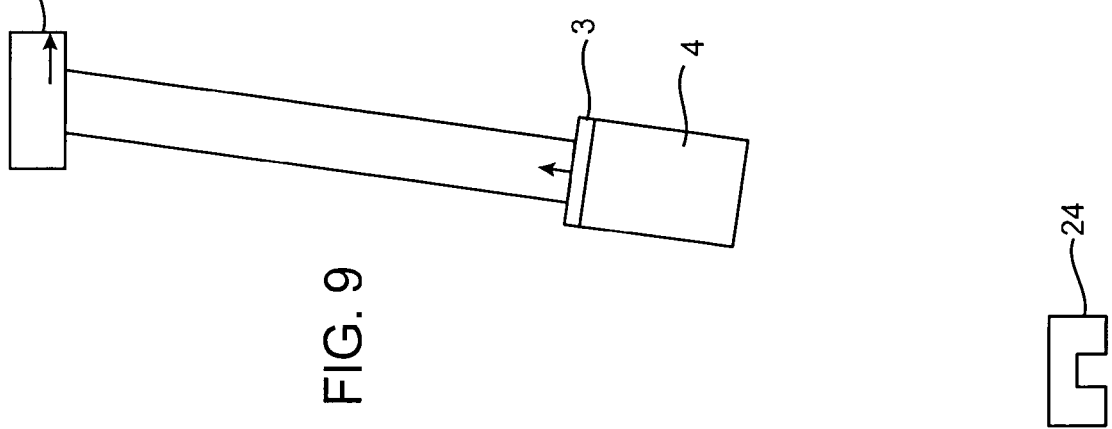

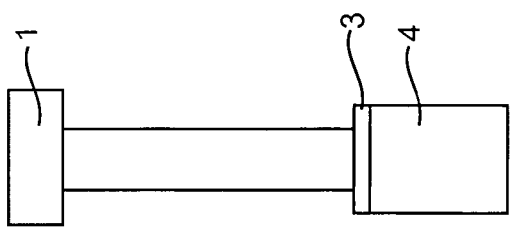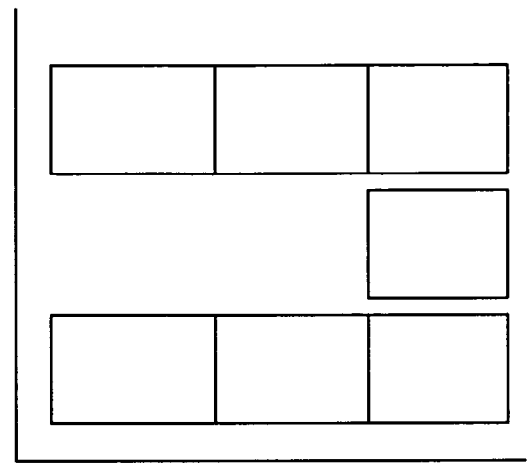
FIG. 11
FIG. 12
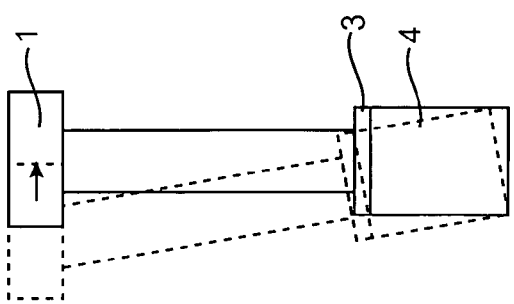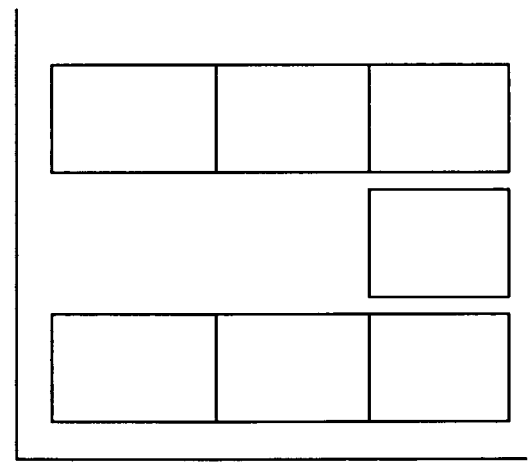

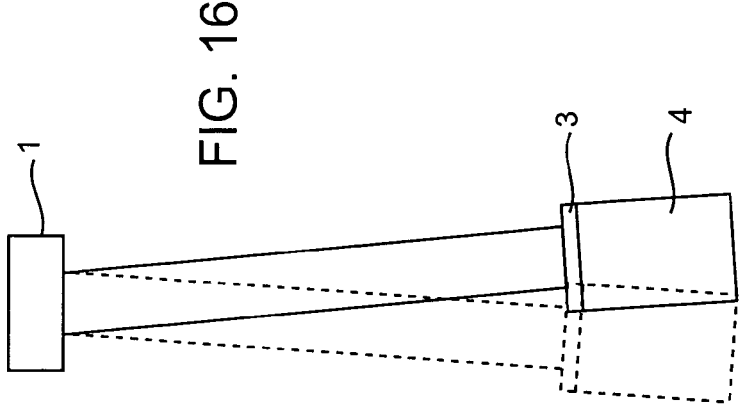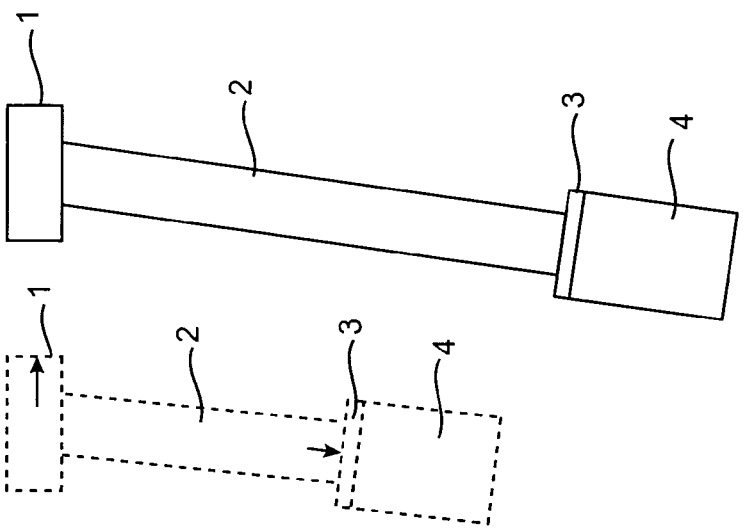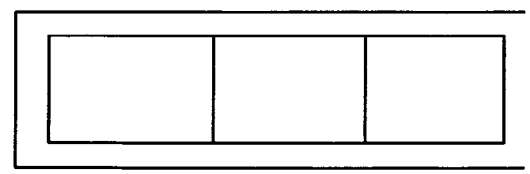

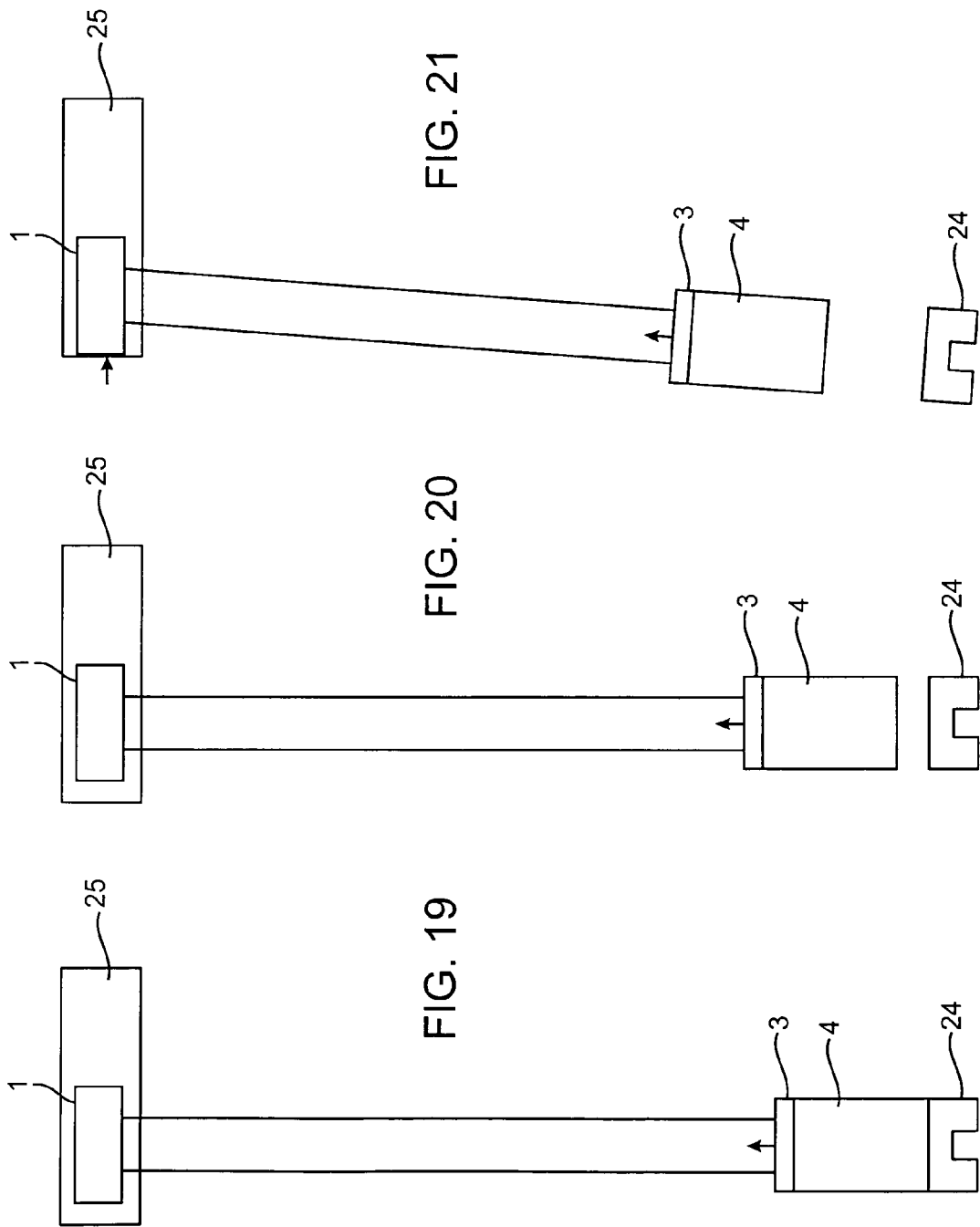

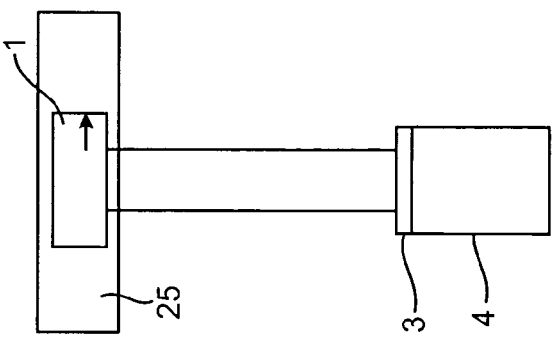
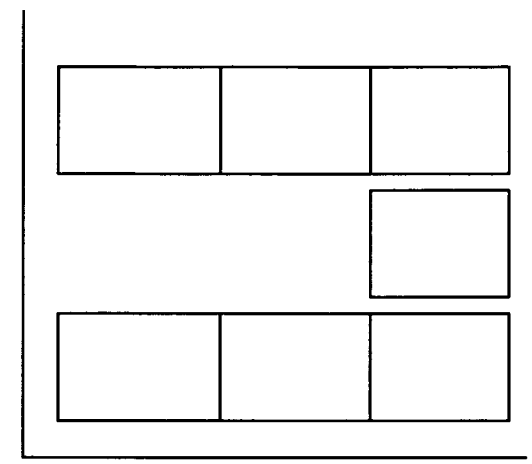
FIG. 24
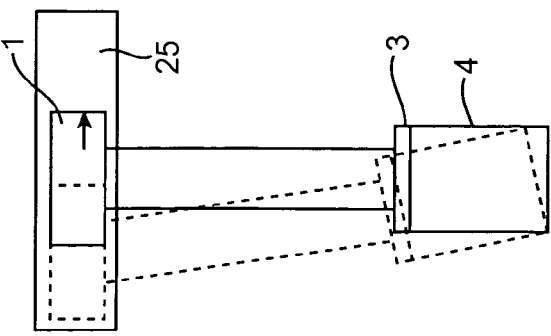
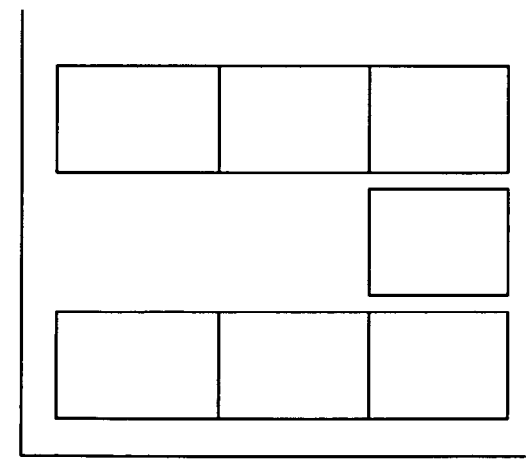
FIG. 25

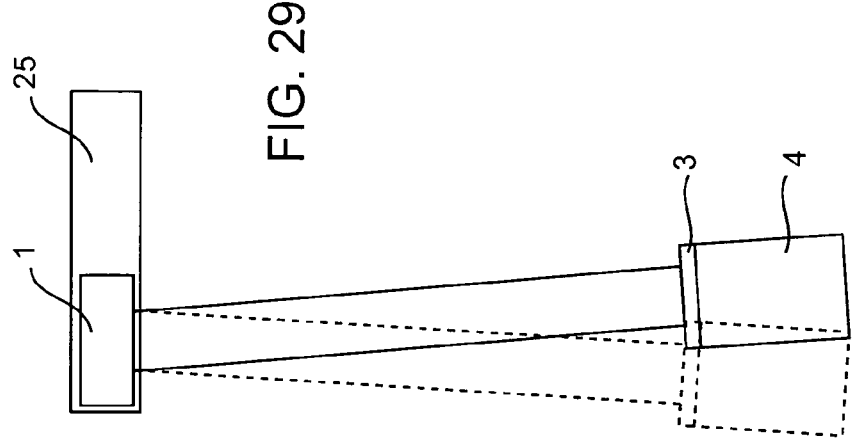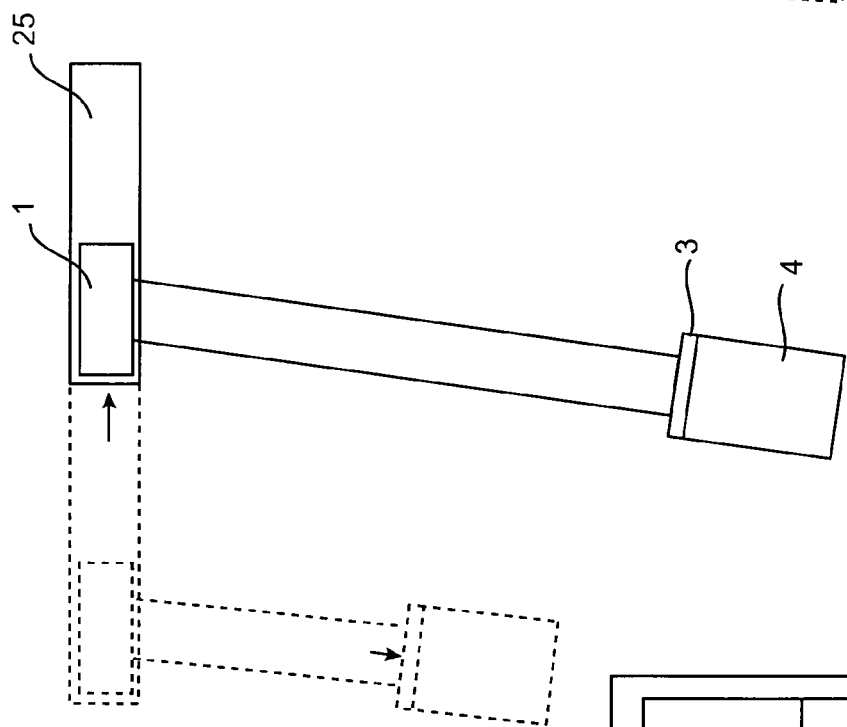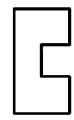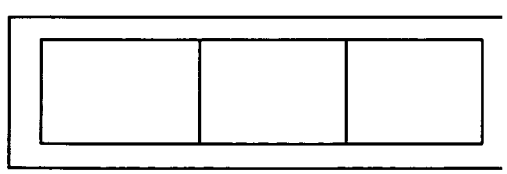

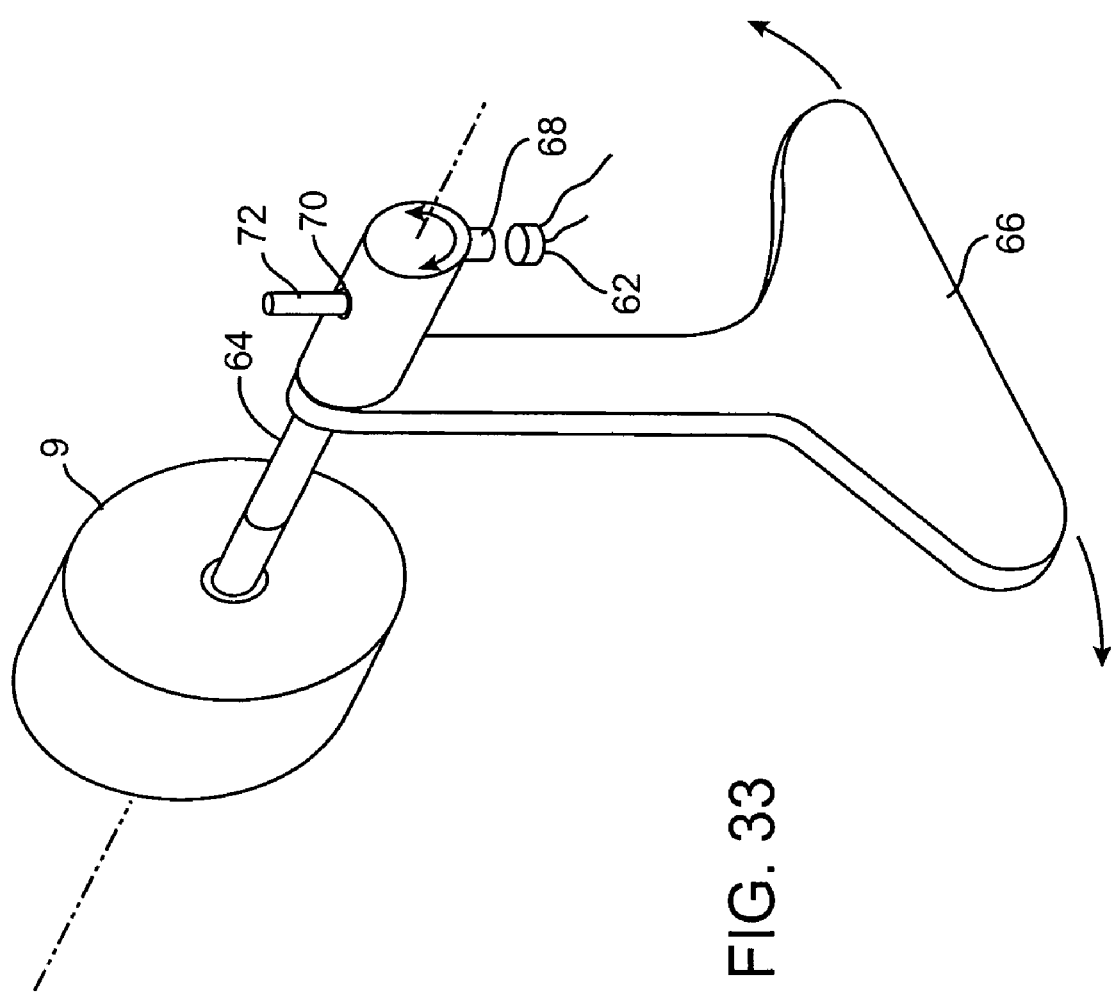

US 7,845,087 B2

APPARATUS AND METHOD FOR MEASURING AND CONTROLLING PENDULUM MOTION

CROSS REFERENCE TO OTHER APPLICATIONS

This application is a continuation-in-part of U.S. patent application Ser. No. 11/582,904, filed Oct. 17, 2006, now U.S. Pat. No. 7,395,605 which is a continuation of U.S. patent application Ser. No. 10/802,301, filed Mar. 16, 2004, now U.S. Pat. No. 7,121,012, which is a continuation-in-part of U.S. patent application Ser. No. 09/461,706, filed Dec. 14, 1999, now abandoned which are hereby incorporated by reference in their entirety.

FIELD OF THE INVENTION

This invention relates to apparatus and methods for measuring and responding to pendulum motion. In particular, it relates to a magnetically damped inclinometer.

BACKGROUND OF THE INVENTION

Gantry-type cranes are often outfitted to serve as container cranes for loading standard freight containers into container ships, and also for unloading the containers from the ships. Typically, a container ship has a large number of cells or compartments in which standard freight containers can be received with only a minimum of clearance, and can be stacked vertically until the cells are full. In order to lower a freight container into a cell, the container must be positioned with a high degree of accuracy over the cell so that the container can be lowered directly into the cell without bumping the deck of the ship or the walls of the cell to any objectionable extent. A gantry-type container crane comprises a substantially horizontal supporting structure or boom with rails thereon along which a trolley is moveable in either direction by an electrically controlled power drive. A hoisting means or system is suspended from the trolley and is moveable horizontally therewith. The hoisting system comprises a system of wire ropes hanging downwardly from the trolley and connected to a load carrying device, preferably a spreader bar grasping device for selectively grasping and releasing a freight container.

A container crane is well adapted for unloading containers from railroad cars or semi-trailer trucks and for loading the containers into the cells of a container ship. In a typical sequence of operations, the trolley is moved horizontally along the boom and is stopped directly over a container on a waiting semi-trailer truck. The spreader bar is lowered by the hoisting system into engagement with the container and is actuated so as to grasp the container, which is then hoisted to a safe elevation so that the container will clear any obstacles on the dock or the container ship. The trolley is then moved outwardly along the boom and over the container ship until the trolley is over the cell into which the container is to be loaded. The object of this maneuvering is to enable the container to be lowered by the hoisting system directly into the cell.

However, considerable difficulty has been experienced by crane operators in aligning the container with the cell with sufficient accuracy to enable the container to be lowered into the cell without any objectionable bumping of the container against the deck of the ship or the walls of the cell. This difficulty arises from the fact that the container starts to swing like the bob of a pendulum when the trolley is stopped. The container may swing through several pendulum cycles before the swinging movement is dissipated sufficiently to enable the crane operator to lower the container into the cell. The trolley constitutes the pivotal support for the pendulum. The suspension means are formed by the hoisting rope system, and the bob is formed by the container and the spreader bar. The problem arising from the pendulum swinging of the container has been widely recognized, but no satisfactory solution has heretofore been devised.

U.S. Pat. Nos. 5,713,477 and 5,909,817 granted to Walter J. Wallace, Jr. and Mark A. Wallace, which are hereby incorporated by reference, describe a method and apparatus for controlling and operating a container crane or other similar cranes. The patents disclose a crane having a horizontal boom or other support structure having at least one rail thereon, a trolley along the rail, a rope hoist, and a load carrying device. A control system causes the driven trolley to be stopped momentarily at a first position. The control system then restarts the trolley and stops it at a second position directly over a transfer position. The control system includes an encoder for determining the total length of the pendulum of the crane and the load. The stopping of the trolley at the first position causes the load to swing forwardly into the first quarter of a pendulum cycle. The control system includes means for adjusting the distance between the first and second positions to correspond with the horizontal component traveled by the load during the first quarter of the pendulum cycle in order to minimize any residual swinging movements when the load is stopped.

While these patents represent a significant step forward in terms of speed and accuracy in operating a container crane or the like by minimizing the residual swinging movements of the load, the control system disclosed has a number of limitations. In particular, the control system has the limitation that it is a predictive, open loop control system where the magnitude of the expected pendulum swing is estimated based on the measured length of the pendulum and the estimated weight of the load, the speed of the trolley, and other parameters. When operating within a narrow range of operating parameters, this open loop control system may be sufficient to avoid excessive swinging of the load.

Furthermore, these systems assume a rigid pendulum model; however, the wire rope, rollers and other portion of the crane do not combine to form a device that acts as a rigid pendulum. Instead, these prior art systems act as more a flexible pendulum.

In order to truly eliminate any residual swinging movements when the load is stopped and to allow the container crane and the control system to operate effectively over a broader range of operating parameters, it would be desirable to measure the actual pendulum motion of the load and to operate the control system with closed loop feedback control. It would be further desirable to accurately measure and cancel the swing of the load in a single step prior to the load swinging back and forth, thereby preventing the load from creating the swinging pattern typically addressed by the prior art systems.

SUMMARY OF THE INVENTION

In keeping with the foregoing discussion, the present invention provides apparatus and methods for measuring and controlling pendulum motion of a load when operating a container crane or the like. Several embodiments of damped inclinometers are used to determine and provide information to respond to the initial sway of the load prior to bringing the load to a stop. The inclinometer has a shaft with attached pendulum that rotates. In some embodiments, the rotation causes an index member to rotate past one or a set of magnets or electromagnets that are connected to the load or spreader bar. The magnet or electromagnet may be mounted directly the spreader bar or it may be in the form of an off center ring. The index member may be a ferromagnetic material, a magnet, a ferrous member or an electromagnet. Another embodiment uses a spring to bias two magnets apart. A cam is attached to the shaft such that, as the pendulum and shaft rotate, a roller connected with the load or spreader bar allows the spring to push the magnets farther apart.

The apparatus for measuring and controlling pendulum motion of the present invention is adapted for use with a gantry-type container crane or the like for loading and unloading standard freight containers from container ships. A pendulum swing measuring apparatus directly measures the pendulum swing of the container as it is transported by the crane and sends a feedback signal indicative of the position or the angle of inclination of the container to the motion control system of the container crane. The feedback signal is used in performing the method for measuring and controlling pendulum motion in a container crane according to the present invention. A pendulum motion cancellation protocol is used to bring the container to a stop precisely over the intended position with little or no residual pendulum motion.

The pendulum swing measuring apparatus may take any one of several possible forms. A first embodiment of the apparatus utilizes a pendulum-type inclinometer mounted on the spreader bar of the container crane for directly measuring the load sway of the container. A second embodiment of the apparatus utilizes an emitter on the spreader bar and a sensor array on the carriage to measure load sway of the container. A third embodiment of the apparatus utilizes optical scanning technology to measure load sway of the container. The feedback signal from the pendulum swing measuring apparatus is used to determine the parameters of the pendulum motion cancellation protocol. By directly measuring the pendulum motion of the load and using closed loop feedback control, the apparatus and methods of the present invention can be used to optimize the effectiveness of the pendulum motion cancellation protocol.

Additional features of the invention include spreader bar scanners and carriage scanners for identifying and/or detecting the position of containers in the load. A modified container crane utilizing a carriage within a carriage can be used in conjunction with the apparatus and methods described.

BRIEF DESCRIPTION OF THE DRAWINGS

FIGS. 6-12 illustrate the operation of the apparatus of FIGS. 1, 2 and 3 performing the method for measuring and controlling pendulum motion in a container crane according to the present invention in use for loading containers onto a cargo ship.

FIGS. 13-18 illustrate the operation of the apparatus of FIGS. 1, 2 and 3 performing the method for measuring and controlling pendulum motion in a container crane according to the present invention in use for unloading containers from a cargo ship.

FIG. 19 illustrates an apparatus for controlling pendulum motion in a container crane according to the present invention utilizing a carriage within a carriage.

FIGS. 20-26 illustrate the operation of the apparatus of FIG. 19 performing the method for controlling pendulum motion in a container crane according to the present invention in use for loading containers onto a cargo ship.

FIGS. 27-31 illustrate the operation of the apparatus of FIG. 19 performing the method for controlling pendulum motion in a container crane according to the present invention in use for unloading containers from a cargo ship.

FIG. 33 is a perspective view of the magnetically damped inclinometer of FIG. 32A having a proximity sensor.

DETAILED DESCRIPTION OF THE INVENTION

The apparatus for measuring and controlling pendulum motion of the present invention is adapted for use with a gantry-type container crane or the like for loading and unloading standard freight containers from container ships. A pendulum swing measuring apparatus directly measures the pendulum swing of the container as it is transported by the crane and sends a feedback signal indicative of the position or the angle of inclination of the container to the motion control system of the container crane. The feedback signal is used in performing the method for measuring and controlling pendulum motion in a container crane according to the present invention. A pendulum motion cancellation protocol is used to bring the container to a stop precisely over the intended position with little or no residual pendulum motion. The pendulum swing measuring apparatus may take any one of several possible forms as described below.

Figure 1:
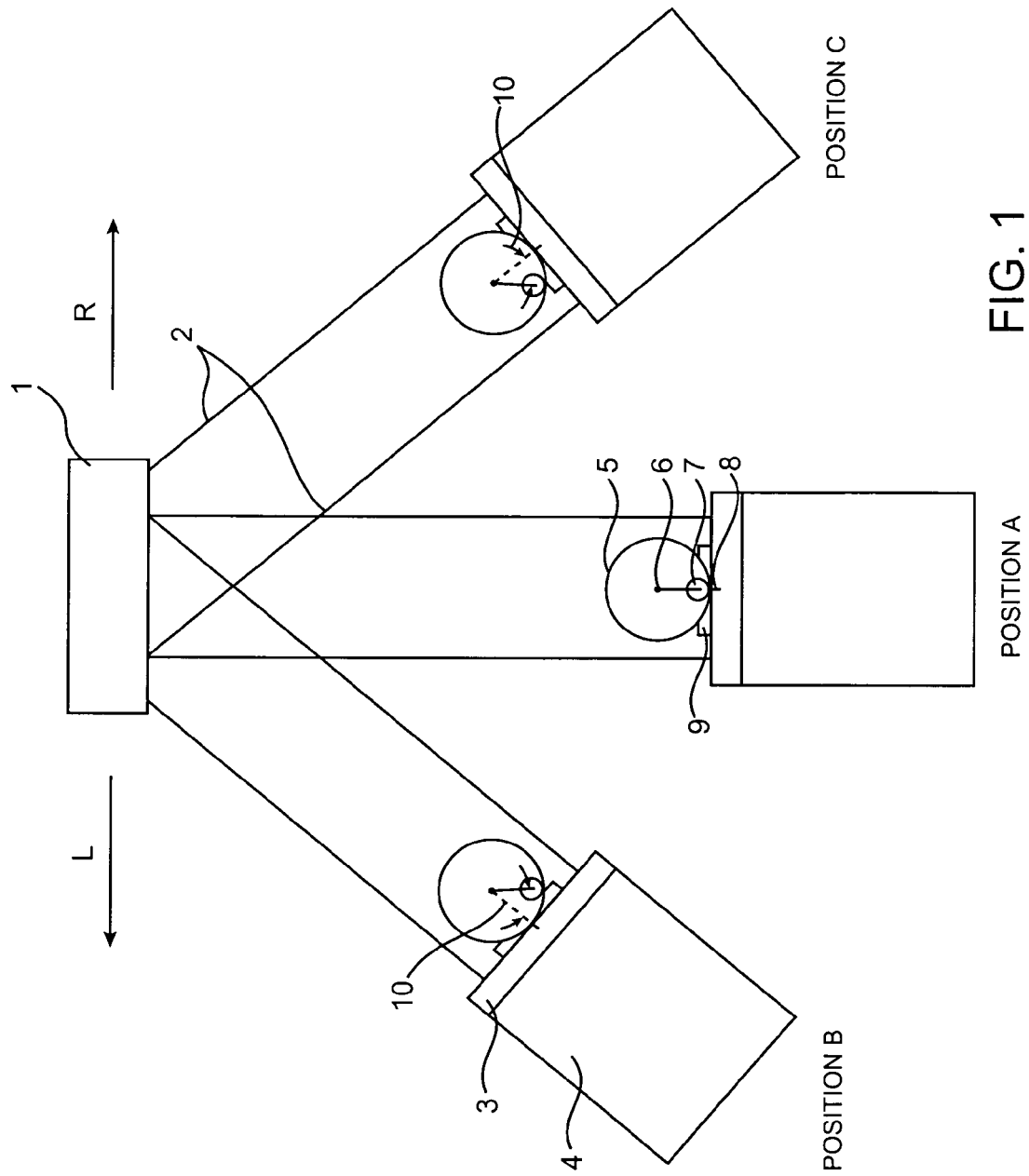
FIG. 1 illustrates a first embodiment of an apparatus for measuring and controlling pendulum motion in a container crane built in accordance with the present invention. A pendulum-type inclinometer mounted on the spreader bar measures load sway of the container.

FIG. 1 illustrates a first embodiment of the apparatus for measuring and controlling pendulum motion in a container crane built in accordance with the present invention. The container crane includes a carriage 1 movably mounted on one or more horizontal rails (not shown) and a spreader bar 3 suspended by lifting cables 2 from the carriage 1. Generally, the carriage 1 is motorized and rides horizontally along the rails on wheels or rollers. The spreader bar 3 will generally have clamps, hooks, straps, cables or other means for grasping and lifting a container 4. The construction details of the container crane itself are not important to the operation of present invention, which is intended to be compatible with any standard container crane or the like. An example of a typical container crane can be found in U.S. Pat. Nos. 5,713,477 and 5,909,817, which have previously been incorporated by reference.

A pendulum-type inclinometer 5 is mounted on the spreader bar 3 to measure the load sway or pendulum motion of the container 4. The inclinometer 5 has a pendulum 6 with a plumb weight 7 and an encoder or potentiometer 9 for measuring the angle of inclination of the pendulum 6 with respect to a reference point 8, which indicates a vertical or neutral position, shown as Position A in FIG. 1. Acceleration of the carriage 1 to the right, as indicated by arrow R, will result in a pendulum swing of the spreader bar 3, and the container 4 which is attached to it, toward the left relative to the carriage 1, as shown in Position B. Acceleration of the carriage 1 to the left, as indicated by arrow L, will result in a pendulum swing of the spreader bar 3, and the container 4 which is attached to it, toward the right, as shown in Position C. The inclinometer 5 sends an analog or digital feedback signal indicative of the angle of inclination of the container 4 to the motion control system of the container crane.

Figure 2:
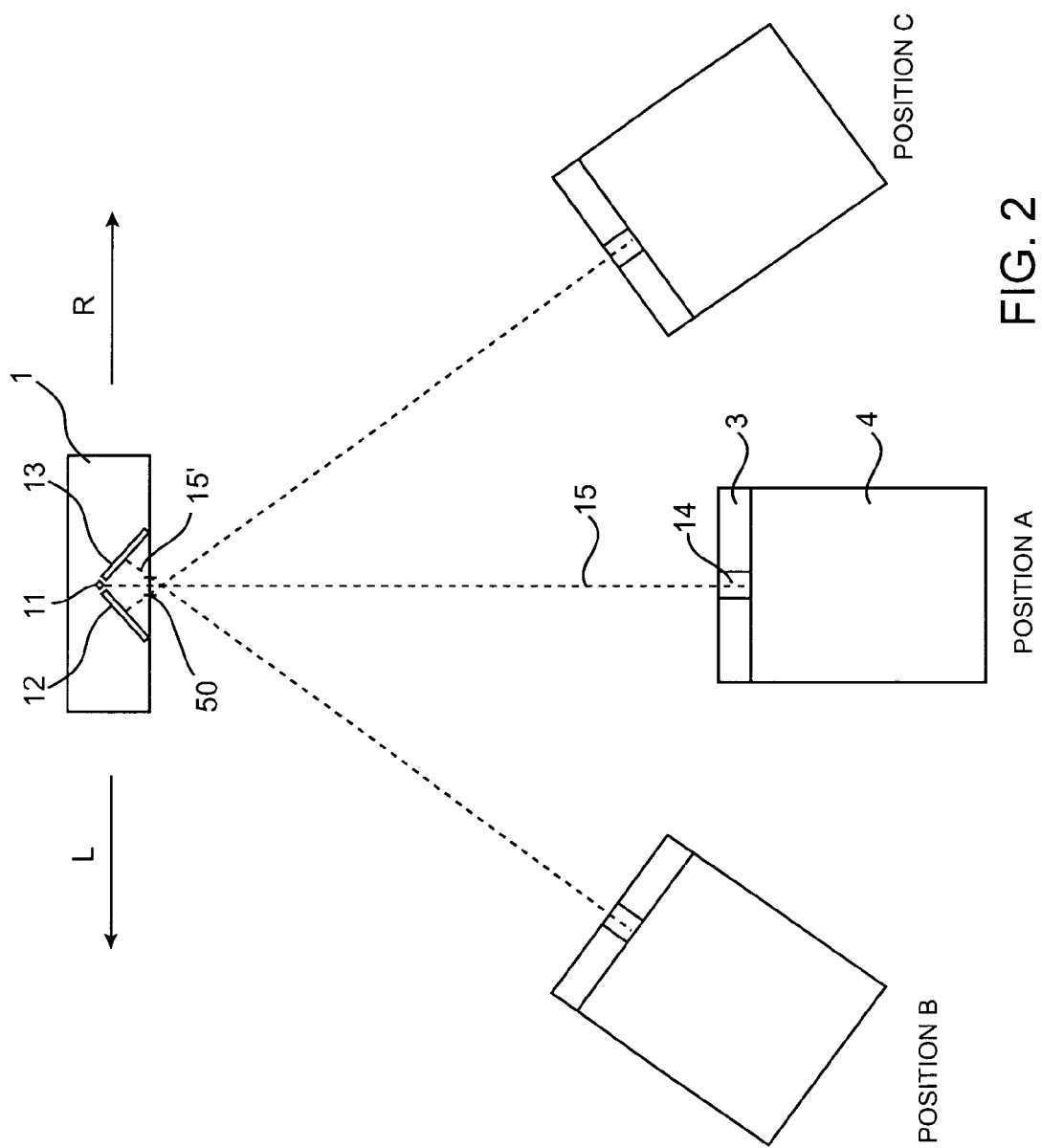
FIG. 2 illustrates a second embodiment of an apparatus for measuring and controlling pendulum motion in a container crane built in accordance with the present invention. An emitter on the spreader bar and a sensor array on the carriage measure load sway of the container.

FIG. 2 illustrates a second embodiment of an apparatus for measuring and controlling pendulum motion in a container crane built in accordance with the present invention. An emitter 14 mounted on the spreader bar 3 emits a signal indicating the position of the spreader bar 3 and the container 4, and a sensor array 11, 12, 13 mounted on the carriage 1 measures the load sway or pendulum motion of the container 4. The lifting cables 2 have been omitted from the drawing for clarity.

In one particularly preferred embodiment, the emitter 14 directs a beam of light 15, such as a laser beam or a narrow pencil beam of visible, infrared or ultraviolet light toward the sensor array 11, 12, 13. The sensor array 11, 12, 13 may be made up of a series of photodiodes, phototransistors or other photosensitive sensors or it may be constructed from one or more position sensitive light detectors. When the emitter 14 and the container 4 are in a vertical or neutral position, shown as Position A, the light beam 15 strikes the central sensor 11. When the carriage 1 accelerates to the right R, the spreader bar 3 and container 4 will swing to the left relative to the carriage 1 (Position B) and the light beam 15 will strike sensor array 13. When the carriage 1 accelerates to the left L, the spreader bar 3 and container 4 will swing to the right (Position C) and the light beam 15 will strike sensor array 12. The sensor array 11, 12, 13 sends an analog or digital feedback signal indicative of the angle of inclination of the container 4 to the motion control system of the container crane.

In an alternative embodiment, the emitter 14 may emit a broad beam of light 15 and a pinhole 50 or a lens may be used to create a narrow beam of light 15', which is directed onto the sensor array 11, 12, 13. Other alternative embodiments may use an emitter 14 that emits an acoustic or radiofrequency signal and a sensor array 11, 12, 13 that is sensitive to acoustic or radiofrequency signals.

Figure 3:
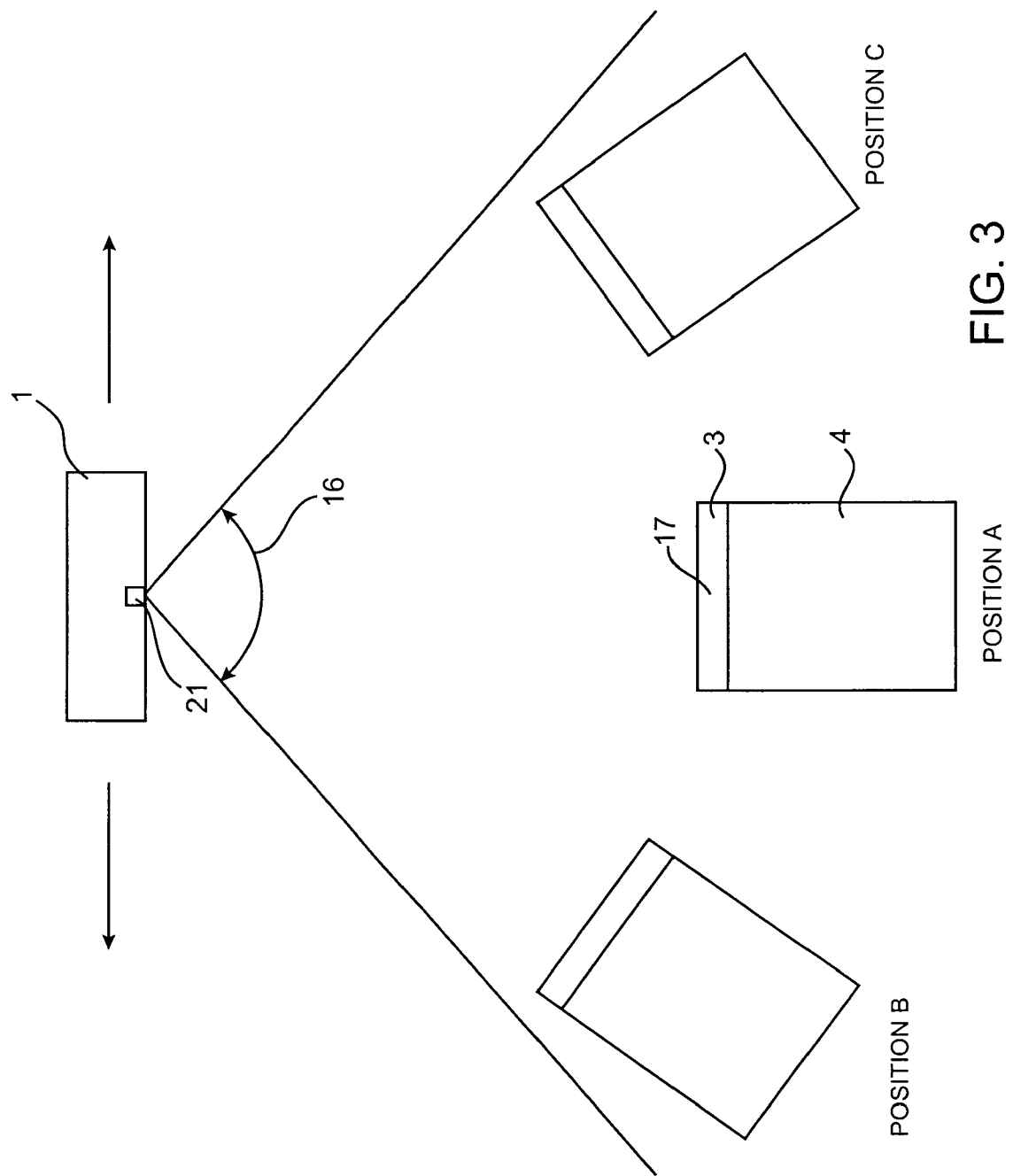
FIGS. 3 and 4 illustrate a third embodiment of an apparatus for measuring and controlling pendulum motion in a container crane built in accordance with the present invention. Optical scanning technology is used to measure load sway of the container.

FIG. 3 illustrates a third embodiment of an apparatus for measuring and controlling pendulum motion in a container crane built in accordance with the present invention. An optical scanner 21 is mounted on the carriage 1 and is directed downward toward the spreader bar 3 and the container 4. The optical scanner 21 detects the position of the spreader bar 3 and container 4 with respect to the carriage 1. Optionally, the spreader bar 3 and/or the container 4 may include optical indicia 17 for facilitating the position detection by the optical scanner 21. The lifting cables 2 have been omitted from the drawing for clarity.

Figure 4:
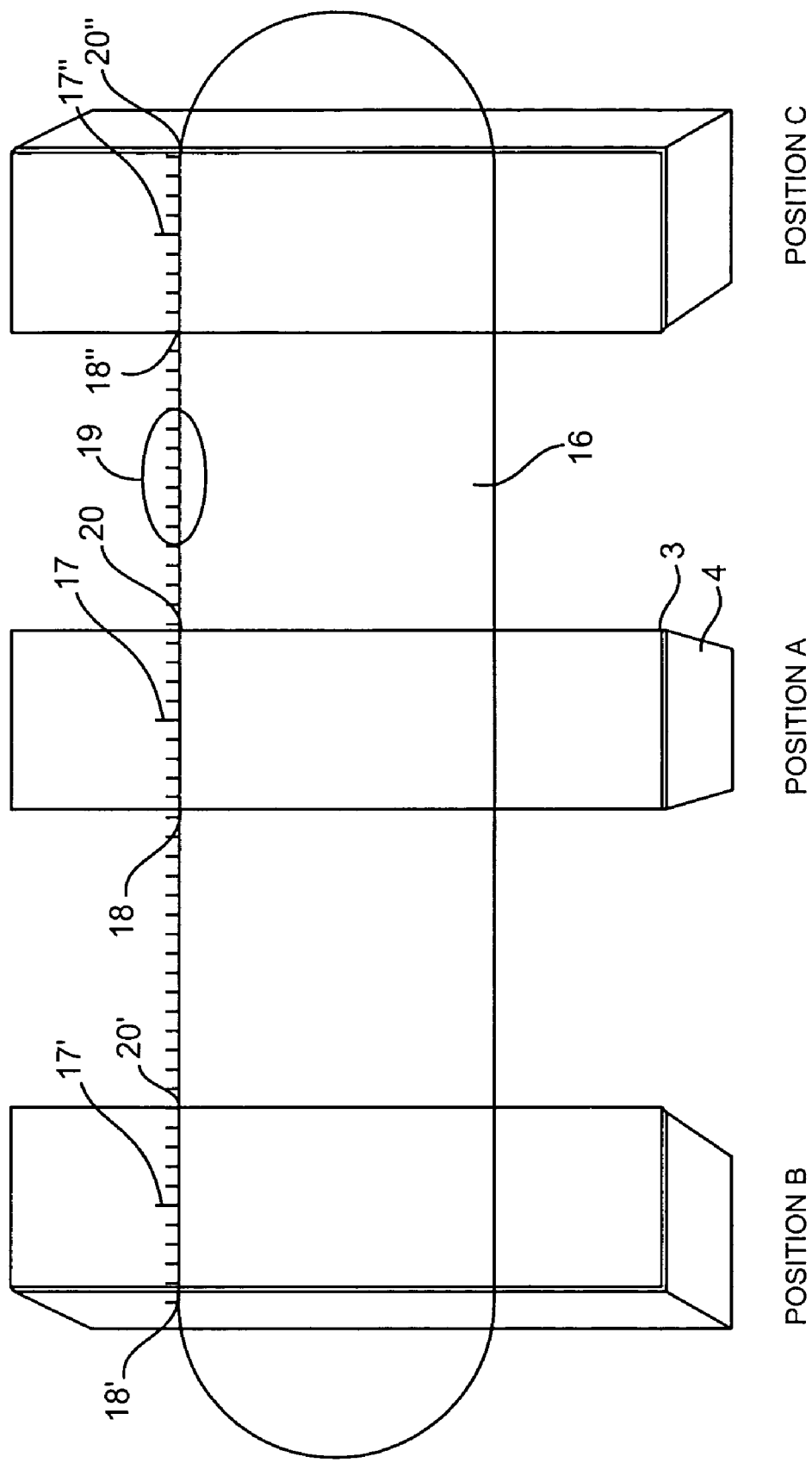

In one particularly preferred embodiment, the optical scanner is in the form of a digital camera 21 with position detection and having a field of view 16 that encompasses the full range of motion of the spreader bar 3 and container 4. FIG. 4 is a top view of the spreader bar 3 and container 4 showing the field of view 16 of the digital camera 21 including a multiplicity of graticule divisions 19. As the spreader bar 3 and container 4 move between positions A, B and C, the digital camera 21 detects the position of edges 18 and 20 and/or the optical indicia 17 with respect to the graticule divisions 19 and sends an analog or digital feedback signal indicative of the position or the angle of inclination of the container 4 to the motion control system of the container crane.

Figure 5:
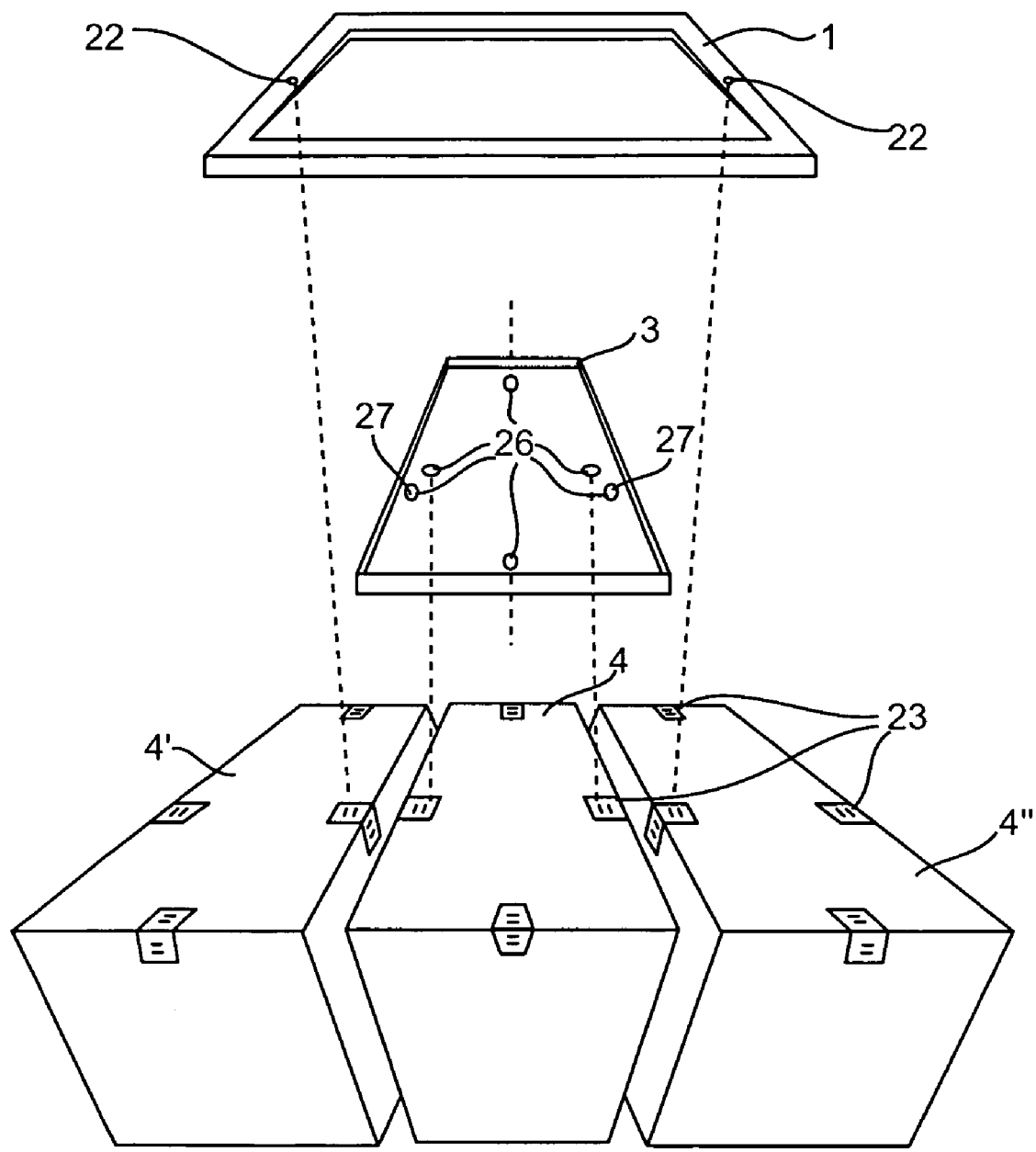
FIG. 5 illustrates a spreader bar and a carriage equipped with scanners for use with the apparatus of FIGS. 1, 2 and 3 for identifying and/or detecting the position of containers in the load.
Figure 8:
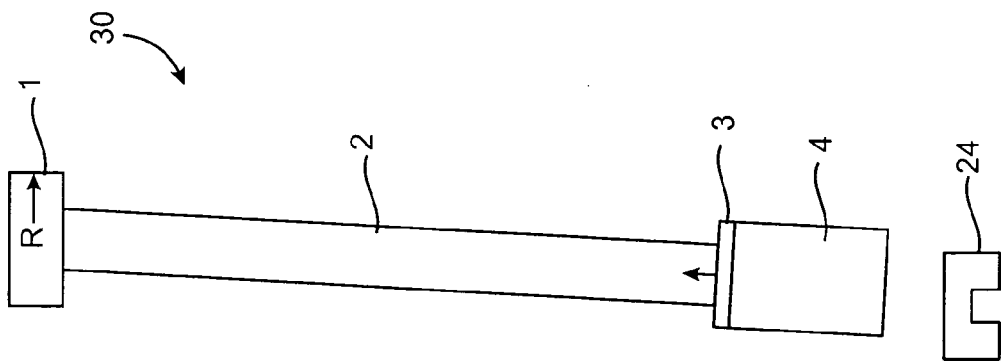

FIG. 5 illustrates additional features of the invention that may be combined with the apparatus of FIG. 1, 2 or 3. The carriage 1 of the container crane is equipped with carriage scanners 22 that are directed downward and to the left and the right of the spreader bar 3. The lifting cables 2 have been omitted from the drawing for clarity. The carriage scanners 22 are for identifying the position of the carriage 1 with respect to the containers 4', 4" adjacent to the target container 4. In addition the carriage scanners 22 may be adapted to identify the adjacent containers 4', 4" and/or their contents. The carriage scanners 22 may be optical scanners, such as bar code scanners or digital cameras with position detection. Alternatively, acoustic or radiofrequency scanners, range finders or other position detectors may be used. Each of the containers, may be provided with optical indicia 23, such as a bar code or the like, for facilitating the position detection and/or identification by the carriage scanners 22.

In addition, the spreader bar 3 is equipped with spreader bar scanners 26 and 27. One or more of the spreader bar scanners 26 are directed downward from the spreader bar 3 to identify the target container 4 and/or to detect the position of the spreader bar 3 with respect to the target container 4. Two more spreader bar scanners 27 are directed slightly downward and to the left and the right of the spreader bar 3 to identify the adjacent containers 4', 4" and/or to detect the position of the spreader bar 3 with respect to the adjacent containers 4', 4". The spreader bar scanners 26, 27 may be optical scanners, such as bar code scanners or digital cameras with position detection. Alternatively, acoustic or radiofrequency scanners, range finders or other position detectors may be used.

Figure 7:
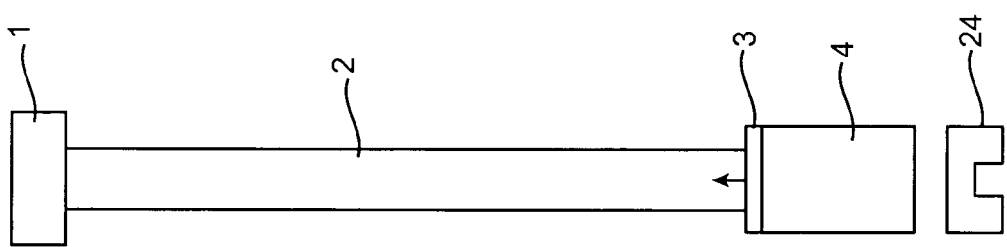
Figure 6:
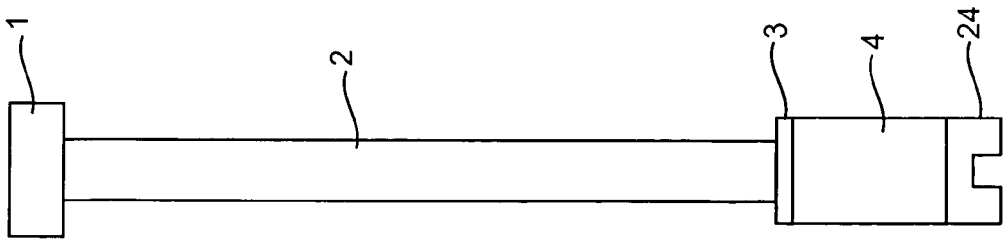
Figure 14:
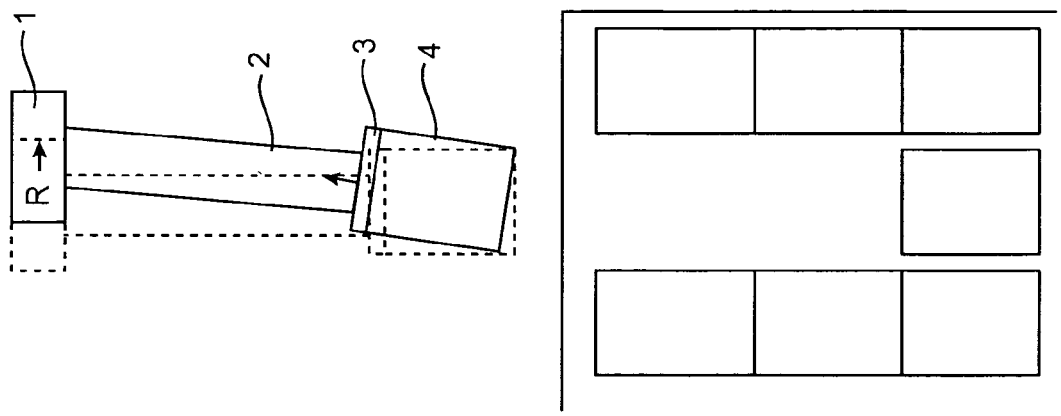

FIGS. 6-12 illustrate the operation of the method for measuring and controlling pendulum motion in a container crane according to the present invention in use for loading containers onto a cargo ship 31. The method may be performed utilizing the apparatus of FIG. 1, 2 or 3 and, optionally, may also utilize the apparatus of FIG. 5. FIG. 6 shows the carriage 1 of the container crane positioned above a container 4 on a truck bed or railway car 24. Optionally, the carriage scanners 22 and/or spreader bar scanners 26, 27 described in connection with FIG. 5 may be used to identify the container 4 and/or to monitor the position of the spreader bar 3 relative to the container 4. The spreader bar 3 is lowered onto the container 4 by the lifting cables 2 and attached to it by appropriate means. FIG. 7 shows the container 4 being lifted off of the truck bed or railway car 24 by the spreader bar 3 and lifting cables 2. Then, the carriage 1 is accelerated toward the cargo ship, which is to the right R of the truck bed or railway car 24 in FIG. 8. Because the inertia of the spreader bar 3 and the container 4 resist the acceleration, the spreader bar 3 and the container 4 swing left relative to the carriage 1, starting one half of a pendulum swing. The pendulum swing measuring apparatus 30, which may be the apparatus of FIG. 1, 2 or 3, measures the pendulum swing and sends a feedback signal indicative of the position or the angle of inclination of the container 4 to the motion control system of the container crane. Preferably, the carriage 1 is accelerated steadily to maintain the lead of the carriage 1 over the spreader bar 3 and container 4 and to prevent further oscillations of the container 4 as it traverses toward the cargo ship 31, as shown in FIG. 9. In transit, the container 4 may be raise or lowered by the spreader bar 3 and lifting cables 2 so that it is at the proper height when it reaches its destination.

When the carriage 1 is close to its intended position over the deck or the cargo hold of the cargo ship 31, the carriage 1 is maneuvered to induce one half of a pendulum swing toward the right, as shown in FIG. 10. This may be done, for example, by stopping the carriage 1 at an intermediate point a short distance before its final position, as described in U.S. Pat. Nos. 5,713,477 and 5,909,817. The distance between the intermediate stopping point and final position are calculated as a function of the actual load sway, as measured by the pendulum swing measuring apparatus 30. If desired, an encoder or the like may be used to measure the length of the lifting cables 2 for use in the calculations. When the container 4 is directly over its intended position, the carriage 1 is quickly accelerated to the right and stopped at the final position, as shown in FIG. 11, to cancel out the one half of a pendulum swing that was induced by the intermediate stop. This brings the spreader bar 3 and container 4 to a stop precisely over the intended position with little or no residual pendulum motion. The effectiveness of the pendulum motion cancellation can be measured with the pendulum swing measuring apparatus 30 and optimized using closed loop feedback control.

The exact stopping and starting or deceleration and acceleration of the carriage 1 for the pendulum motion cancellation protocol are not critical to the present invention. By directly measuring the pendulum motion of the load and using closed loop feedback control, the apparatus and methods of the present invention can be used to optimize almost any pendulum motion cancellation protocol. For example in an alternative method, the carriage 1 may be decelerated without fully stopping to induce one half of a pendulum swing, then accelerated and stopped at the final position to cancel out the one half of a pendulum swing. Other alternative methods of maneuvering the carriage 1 to control pendulum swing usable with the present invention are described in U.S. Pat. Nos. 3,921,818 and 4,756,432, which are hereby incorporated by reference.

Once the spreader bar 3 and container 4 are stopped over the intended position, their positions relative to the adjacent containers may be verified using the carriage scanners 22 and/or spreader bar scanners 27 described in connection with FIG. 5. As the container 4 is lowered into place, the spreader bar scanners 27 can be used to monitor its vertical, as well as horizontal, position relative to the adjacent containers, as shown in FIG. 13.

Figure 13:
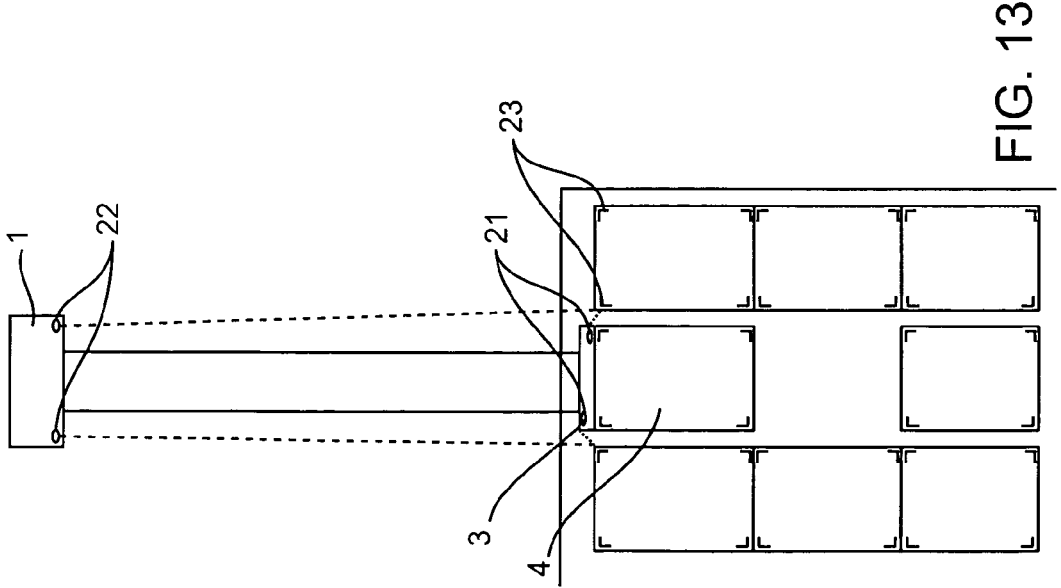

FIGS. 13-18 illustrate the operation of the method for measuring and controlling pendulum motion in a container crane according to the present invention in use for unloading containers from a cargo ship 31. The method may be performed utilizing the apparatus of FIG. 1, 2 or 3 and, optionally, may also utilize the apparatus of FIG. 5. The carriage 1 of the container crane is moved into position above a container 4 on the deck or in the cargo hold of the cargo ship 31, as shown in FIG. 13. Optionally, the carriage scanners 22 and/or spreader bar scanners 26, 27 described in connection with FIG. 5 may be used to identify the container 4 and/or to monitor the position of the spreader bar 3 relative to the container 4, as well as its vertical and horizontal position relative to the adjacent containers. The spreader bar 3 is lowered onto the container 4 and attached to it by appropriate means, then the container 4 is lifted by the spreader bar 3 and lifting cables 2. Once the container 4 is clear of the cargo hold or any other obstacles, the carriage 1 is accelerated toward the off-loading location, which is to the right R of the cargo ship in FIG. 14. Due to their inertia resisting the acceleration, the spreader bar 3 and the container 4 swing left relative to the carriage 1, starting one half of a pendulum swing. The pendulum swing measuring apparatus 30, which may be the apparatus of FIG. 1, 2 or 3, measures the pendulum swing and sends a feedback signal indicative of the position or the angle of inclination of the container 4 to the motion control system of the container crane. Preferably, the carriage 1 is accelerated steadily to maintain the lead of the carriage 1 over the spreader bar 3 and container 4 and to prevent further oscillations of the container 4 as it traverses toward the off-loading location, as shown in phantom lines in FIG. 15. In transit, the container 4 may be raise or lowered by the spreader bar 3 and lifting cables 2 so that it is at the proper height when it reaches its destination.

Figure 17:
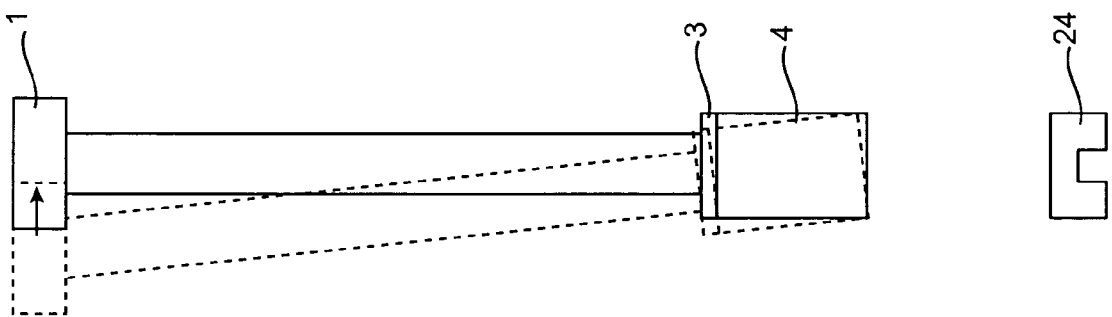
Figure 18:
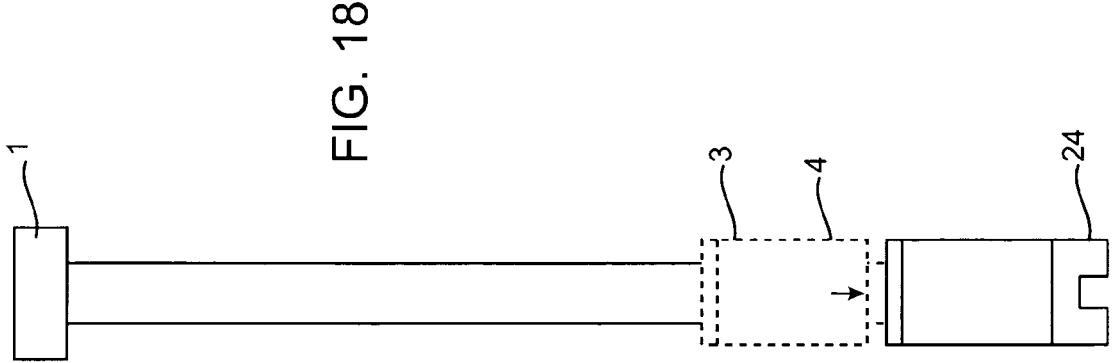

When the carriage 1 is close to its intended position over the off-loading location, such as a dock, truck bed or railway car 24 the carriage 1 is maneuvered to induce one half of a pendulum swing toward the right, as shown in FIG. 16. For example, the carriage 1 may be stopped at an intermediate point a short distance before its final position. The distance between the intermediate stopping point and final position are calculated as a function of the actual load sway, as measured by the pendulum swing measuring apparatus 30. Again, if desired, an encoder or the like may be used to measure the length of the lifting cables 2 for use in the calculations. When the container 4 is directly over its intended position, the carriage 1 is quickly accelerated to the right and stopped at the final position, as shown in FIG. 17, to cancel out the one half of a pendulum swing that was induced by the intermediate stop. This brings the spreader bar 3 and container 4 to a stop precisely over the intended position with little or no residual pendulum motion. The effectiveness of the pendulum motion cancellation can be measured with the pendulum swing measuring apparatus 30 and optimized using closed loop feedback control. The container 4 is then lowered at the off-loading location onto a dock, truck bed or railway car 24 or the like, as shown in FIG. 18.

As mentioned above, the exact stopping and starting or deceleration and acceleration of the carriage 1 for the pendulum motion cancellation protocol are not critical to the present invention. By directly measuring the pendulum motion of the load and using closed loop feedback control, the apparatus and methods of the present invention can be used to optimize almost any pendulum motion cancellation protocol.

FIG. 19 illustrates an apparatus for controlling pendulum motion in a container crane according to the present invention utilizing a secondary carriage 25 within a primary carriage 1. The primary carriage 1 rides horizontally on wheels or rollers along the rails of a container crane or the like. The secondary carriage 25 is movably mounted on the primary carriage 1 so that it can move back and forth along the same axis as the primary carriage 1. The primary carriage 1 and secondary carriage 25 are shown schematically since the actual construction of the mounting can take any one of many possible forms. For example the primary carriage 1 may include one or more secondary rails and a motor or the like for moving the secondary carriage 25 along the secondary rails relative to the primary carriage 1. Alternatively, the secondary carriage 25 may be moved relative to the primary carriage 1 by a linear actuator, such as a hydraulic or pneumatic cylinder, a rodless cylinder, a linear motor or the like. The range of motion of the secondary carriage 25 relative to the primary carriage 1 should be enough for carrying out the chosen pendulum motion cancellation protocol. Typically, the secondary carriage 25 will have a lower inertia than the primary carriage 1, which will facilitate performing the pendulum motion cancellation protocol. In addition, the secondary carriage 25 can be used for making fine adjustments in position more easily than the primary carriage 1. Preferably, the apparatus of FIG. 19 will utilize a pendulum swing measuring apparatus 30, such as those described in connection with FIGS. 1, 2 and 3, and, optionally, may also utilize the apparatus of FIG. 5.

Figure 22:
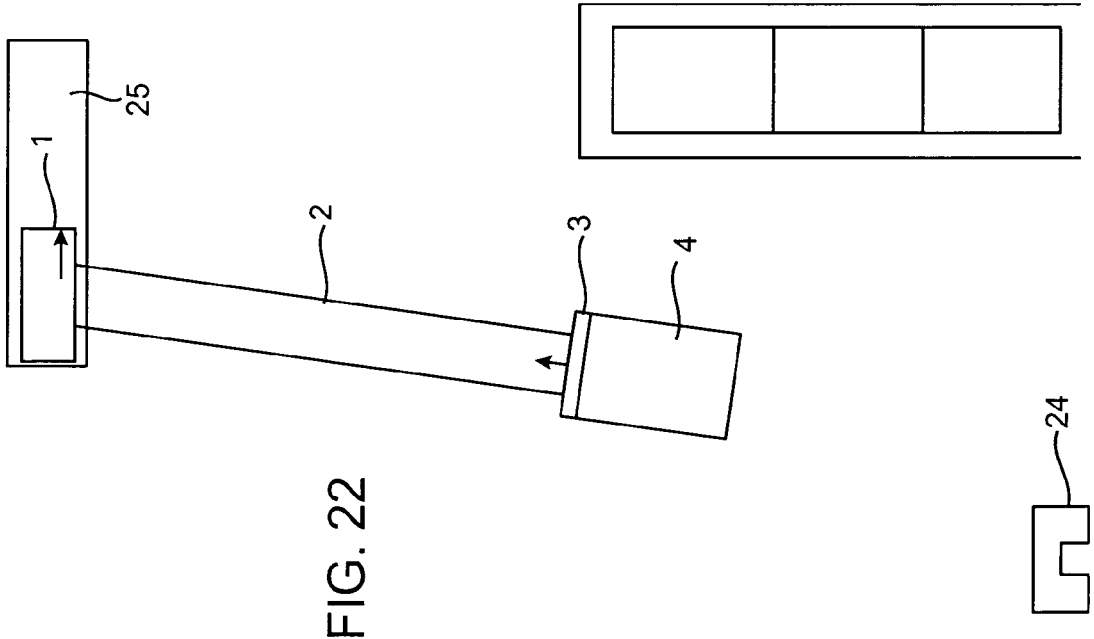
Figure 27:
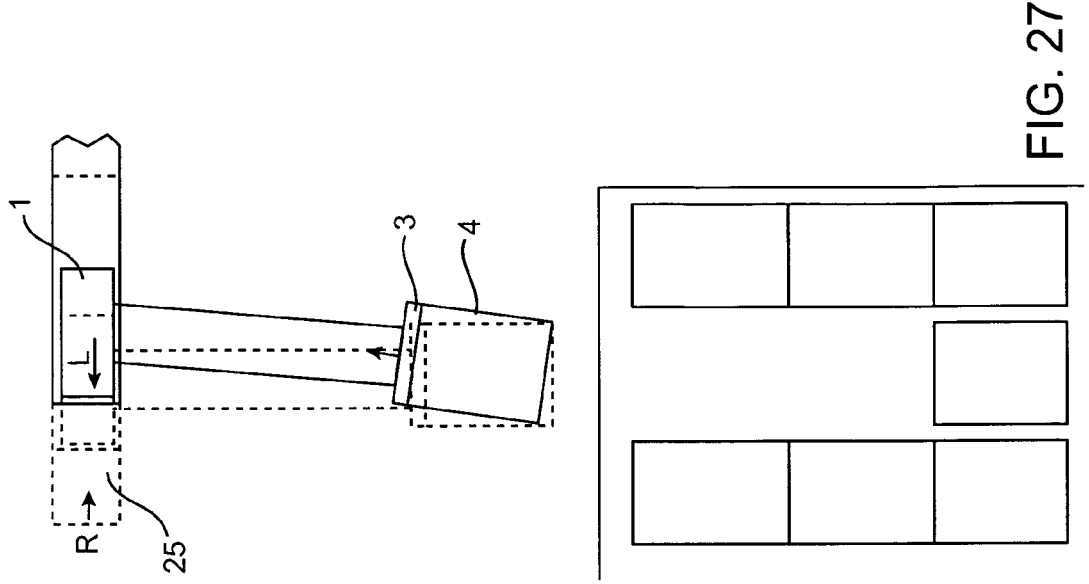

FIGS. 20-26 illustrate the operation of the apparatus of FIG. 19 performing the method for controlling pendulum motion in a container crane according to the present invention in use for loading containers onto a cargo ship 31. In FIG. 19, the primary carriage 1 is positioned above a container 4 on a truck bed or railway car 24, shown in this example with the secondary carriage 25 in the far left position relative to the primary carriage 1. Optionally, the carriage scanners 22 and/or spreader bar scanners 26, 27 described in connection with FIG. 5 may be used to identify the container 4 and/or to monitor the position of the spreader bar 3 relative to the container 4. FIG. 20 shows the container 4 being lifted off of the truck bed or railway car 24 by the spreader bar 3 and lifting cables. Then, the primary carriage 1 is accelerated toward the cargo ship, which is to the right R of the truck bed or railway car 24 in FIG. 21. Due to their inertia resisting the acceleration, the spreader bar 3 and the container 4 swing left relative to the primary carriage 1, starting one half of a pendulum swing. The pendulum swing measuring apparatus 30, measures the pendulum swing and sends a feedback signal indicative of the position or the angle of inclination of the container 4 to the motion control system of the container crane. Preferably, the primary carriage 1 is accelerated steadily to maintain the lead of the primary carriage 1 over the spreader bar 3 and container 4 and to prevent further oscillations of the container 4 as it traverses toward the cargo ship 31, as shown in FIG. 22. In transit, the container 4 may be raise or lowered by the spreader bar 3 and lifting cables 2 so that it is at the proper height when it reaches its destination.

Figure 23:
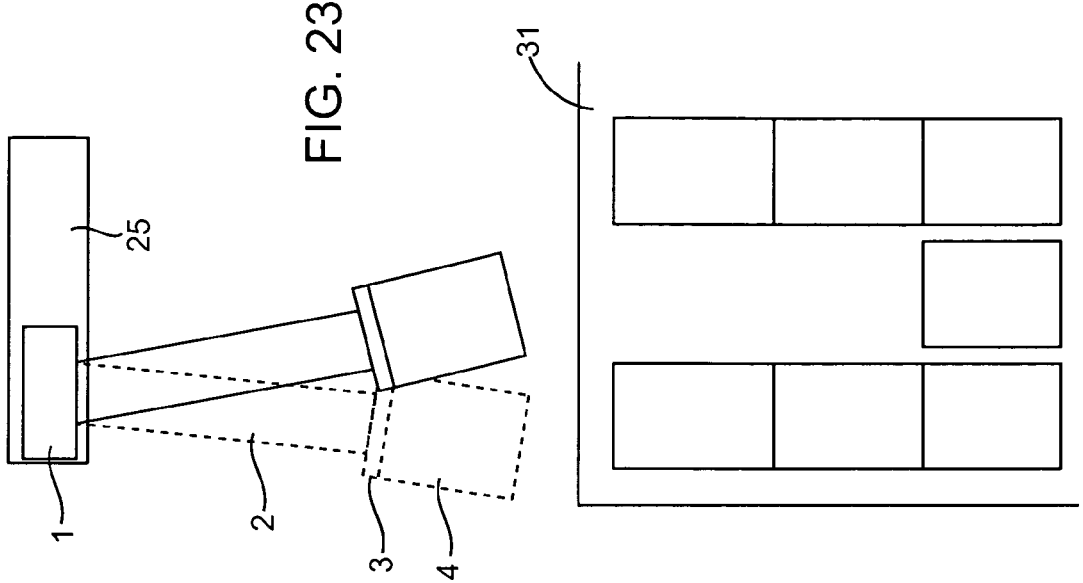

When the primary carriage 1 reaches its intended position above the deck or the cargo hold of the cargo ship 31, the primary carriage 1 is brought to a stop with the secondary carriage 25 positioned to the left of the target position. Stopping the primary carriage 1 induces the spreader bar 3 and the container 4 to swing toward the right, as shown in FIG. 23. When the container 4 is directly over its intended position, the secondary carriage 25 is quickly accelerated to the right R relative to the primary carriage 1 and stopped at the final position, as shown in FIG. 24, to cancel out the one half of a pendulum swing that was induced by stopping the primary carriage 1. This brings the spreader bar 3 and container 4 to a stop precisely over the intended position with little or no residual pendulum motion, as shown in FIG. 25. The effectiveness of the pendulum motion cancellation can be measured with the pendulum swing measuring apparatus 30 and optimized using closed loop feedback control.

Figure 26:
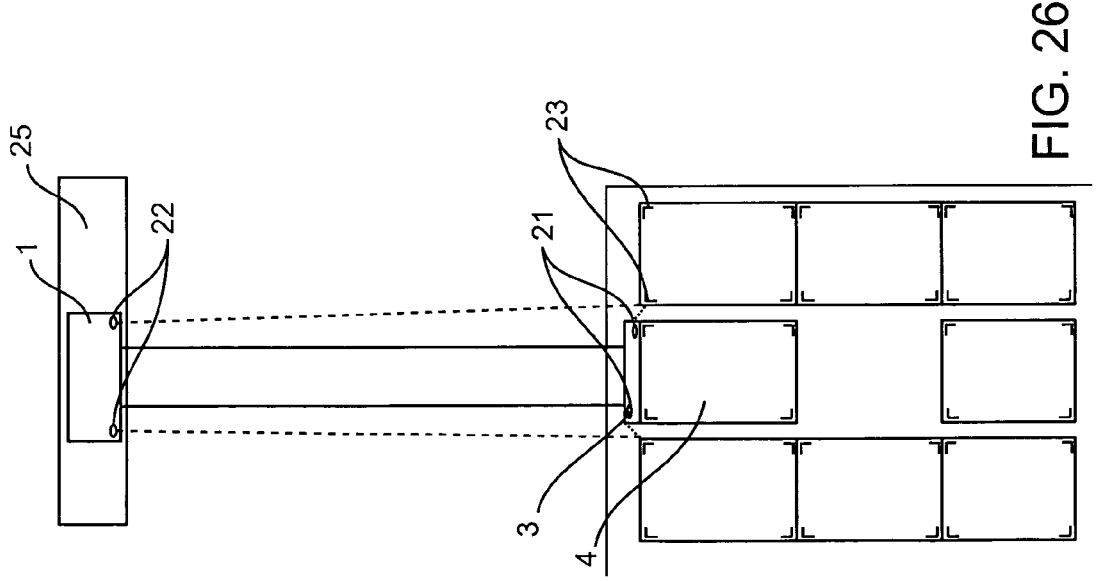

Once the spreader bar 3 and container 4 are stopped over the intended position, their positions relative to the adjacent containers may be verified using the carriage scanners 22 and/or spreader bar scanners 27 described in connection with FIG. 5. As the container 4 is lowered into place, the spreader bar scanners 27 can be used to monitor its vertical, as well as horizontal, position relative to the adjacent containers, as shown in FIG. 26.

FIGS. 27-31 illustrate the operation of the apparatus of FIG. 19 performing the method for controlling pendulum motion in a container crane according to the present invention in use for unloading containers from a cargo ship 31. The primary carriage 1 of the container crane, shown in this example with the secondary carriage 25 in the center of the primary carriage 1, is moved into position above a container 4 on the deck or in the cargo hold of the cargo ship 31. The spreader bar 3 is lowered onto the container 4 and attached to it by appropriate means, then the container 4 is lifted by the spreader bar 3 and lifting cables 2, as shown in FIG. 26. Optionally, the carriage scanners 22 and/or spreader bar scanners 26, 27 described in connection with FIG. 5 may be used to identify the container 4 and/or to monitor the position of the spreader bar 3 relative to the container 4, as well as its vertical and horizontal position relative to the adjacent containers. Once the container 4 is clear of the cargo hold or any other obstacles, the primary carriage 1 is accelerated toward the off-loading location, which is to the right R of the cargo ship in FIG. 27. Due to their inertia resisting the acceleration, the spreader bar 3 and the container 4 swing left relative to the primary carriage 1, starting one half of a pendulum swing. The pendulum swing measuring apparatus 30 measures the pendulum swing and sends a feedback signal indicative of the position or the angle of inclination of the container 4 to the motion control system of the container crane. Preferably, the primary carriage 1 is accelerated steadily to maintain the lead of the primary carriage 1 over the spreader bar 3 and container 4 and to prevent further oscillations of the container 4 as it traverses toward the off-loading location, as shown in phantom lines in FIG. 28. In transit, the container 4 may be raise or lowered by the spreader bar 3 and lifting cables 2 so that it is at the proper height when it reaches its destination. Optionally, the position of the secondary carriage 25 relative to the primary carriage 1 may be adjusted at the beginning of the traverse or in transit, as shown by the arrow L in FIG. 27, so that it is in the proper position for performing the pendulum motion cancellation protocol when it reaches its destination.

Figure 31:
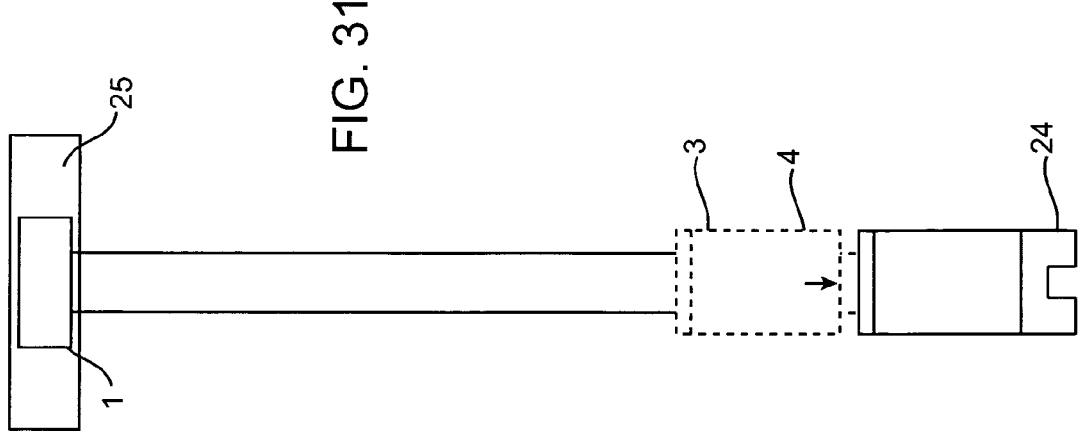
Figure 30:
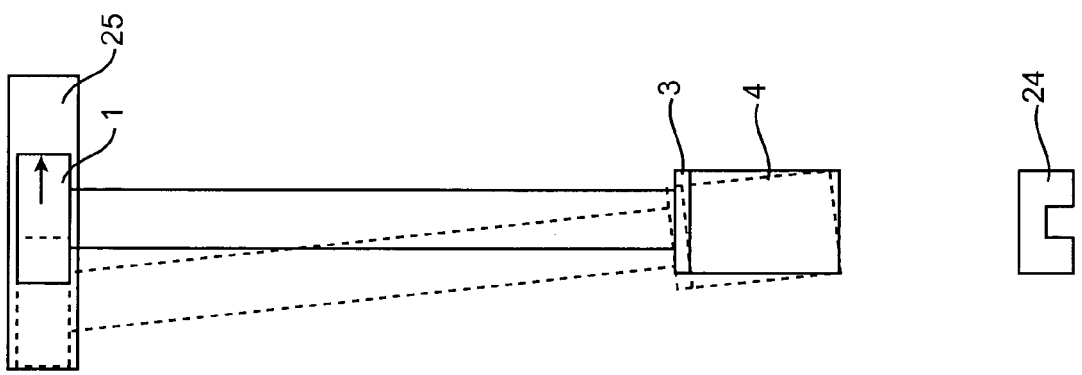

When the primary carriage 1 reaches its intended position over the off-loading location, such as a dock, truck bed or railway car 24, the primary carriage 1 is brought to a stop with the secondary carriage 25 positioned to the left of the target position. Stopping the primary carriage 1 induces the spreader bar 3 and the container 4 to swing toward the right, as shown in FIG. 29. When the container 4 is directly over its intended position, the secondary carriage 25 is quickly accelerated to the right R relative to the primary carriage 1 and stopped at the final position, as shown in FIG. 30, to cancel out the one half of a pendulum swing that was induced by stopping the primary carriage 1. This brings the spreader bar 3 and container 4 to a stop precisely over the intended position with little or no residual pendulum motion, as shown in FIG. 31. The effectiveness of the pendulum motion cancellation can be measured with the pendulum swing measuring apparatus 30 and optimized using closed loop feedback control. The container 4 is then lowered onto a dock, truck bed or railway car 24 or the like at the off-loading location.

As with the previously described methods, the exact stopping and starting or deceleration and acceleration of the apparatus for the pendulum motion cancellation protocol are not critical to the present invention. Other pendulum motion cancellation protocols can be carried out using the primary carriage 1 and secondary carriage 25 of the apparatus of FIG. 19. By directly measuring the pendulum motion of the load and using closed loop feedback control, the apparatus and methods of the present invention can be used to optimize almost any pendulum motion cancellation protocol.

FIGS. 32-36 disclose several versions of magnetically damped inclinometers 60. Damping the motion of the pendulum 66 increases the accuracy and reliability of the inclinometer by damping out oscillations not causes by the primary sway of the object or load. This stabilizes the oscillations for calculation purposes, cancels unwanted harmonics, can be used to reset the pendulum indicator to plumb, calibration and diagnostics.

Figure 32A:
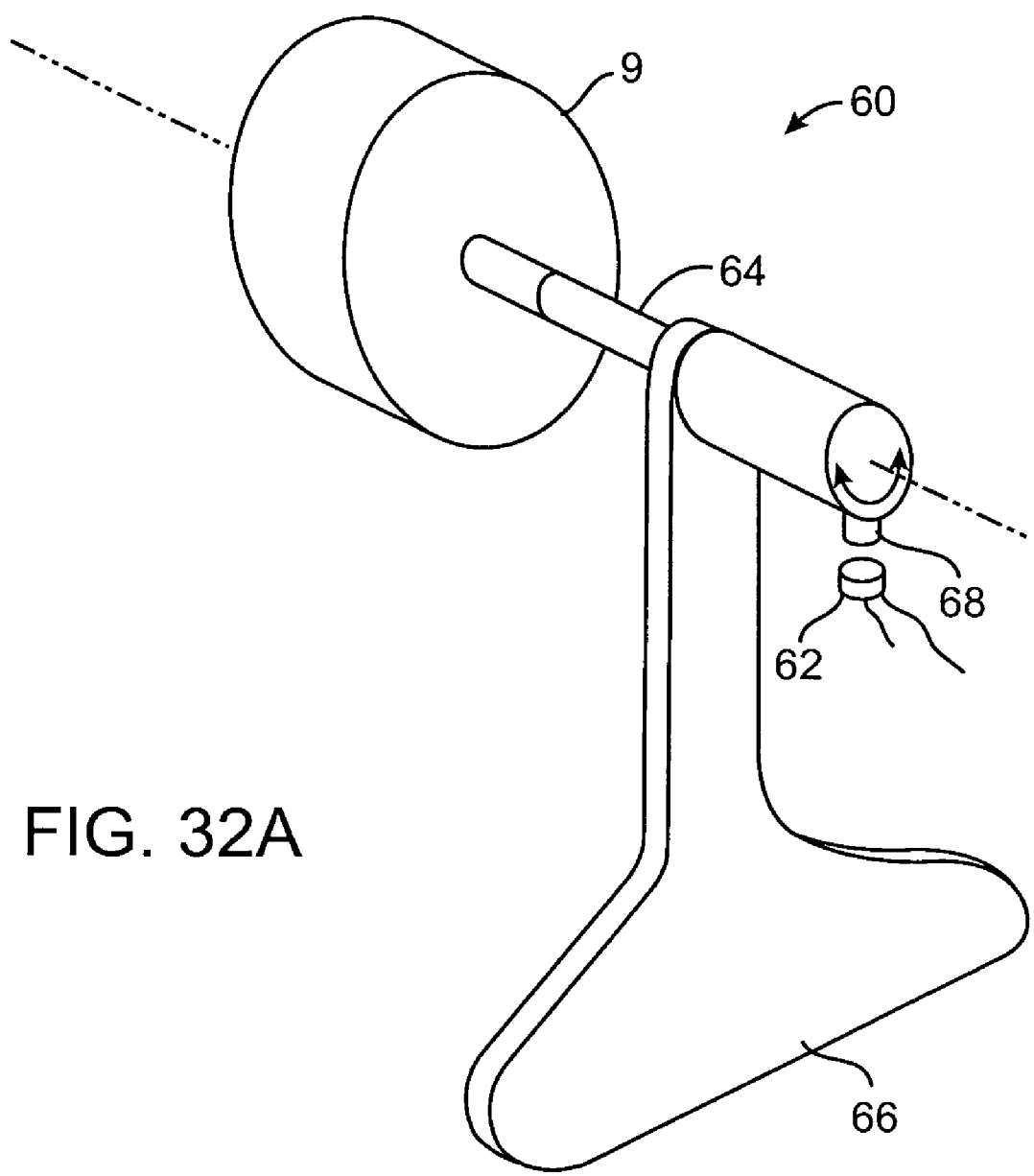
FIG. 32A is a perspective view of a magnetically damped inclinometer using an electromagnet.

These may be used in place of or in combination with the systems discussed above. FIG. 32A is a perspective view of a magnetically damped inclinometer 60 using an electromagnet 62. A rotatable shaft 64 extends from the housing of the encoder or potentiometer 9. In the systems shown, the inclinometer 60 is connected with the object or load being moved, for example connected with one of the spreader bars. However, the inclinometer 60 may be attached to the object or load at any convenient location. A pendulum 66 is fixedly attached to the shaft 64. To maximize the accuracy of the measurements and the dampening control, a rigid or generally rigid material is used to form the pendulum 66. Any motion of the pendulum 66 causes a corresponding rotation of the shaft 64, as indicated by the rotational arrows. Also attached to the shaft 64 is an index member 68 formed of a ferrous or ferromagnetic material. The index member 68 may be located anywhere along the shaft 64 including, as shown, at or near the end of the shaft 64. An electromagnet 62 is attached to the object or load and is located such that when the pendulum 66 is in its initial, at-rest position, the index member 68 and the electromagnet 62 are close together. As the object or load is moved, the pendulum 66 will sway, causing the shaft to rotate 64 and moving the index member 68 and the electromagnet 62 apart, thereby increasing the air gap. As the pendulum 66 swings back, the index member swings past the electromagnet. The force of the electromagnet 62 pulls on the index member 68, thereby decreasing the extent of the next swing. Since the force from the electromagnet 62 decreases as the air gap increases, the extent of the swing is not significantly reduced, but any excess motion is reduced. This damping action takes place each time the index member 68 passes the electromagnet 62.

Figure 32B:
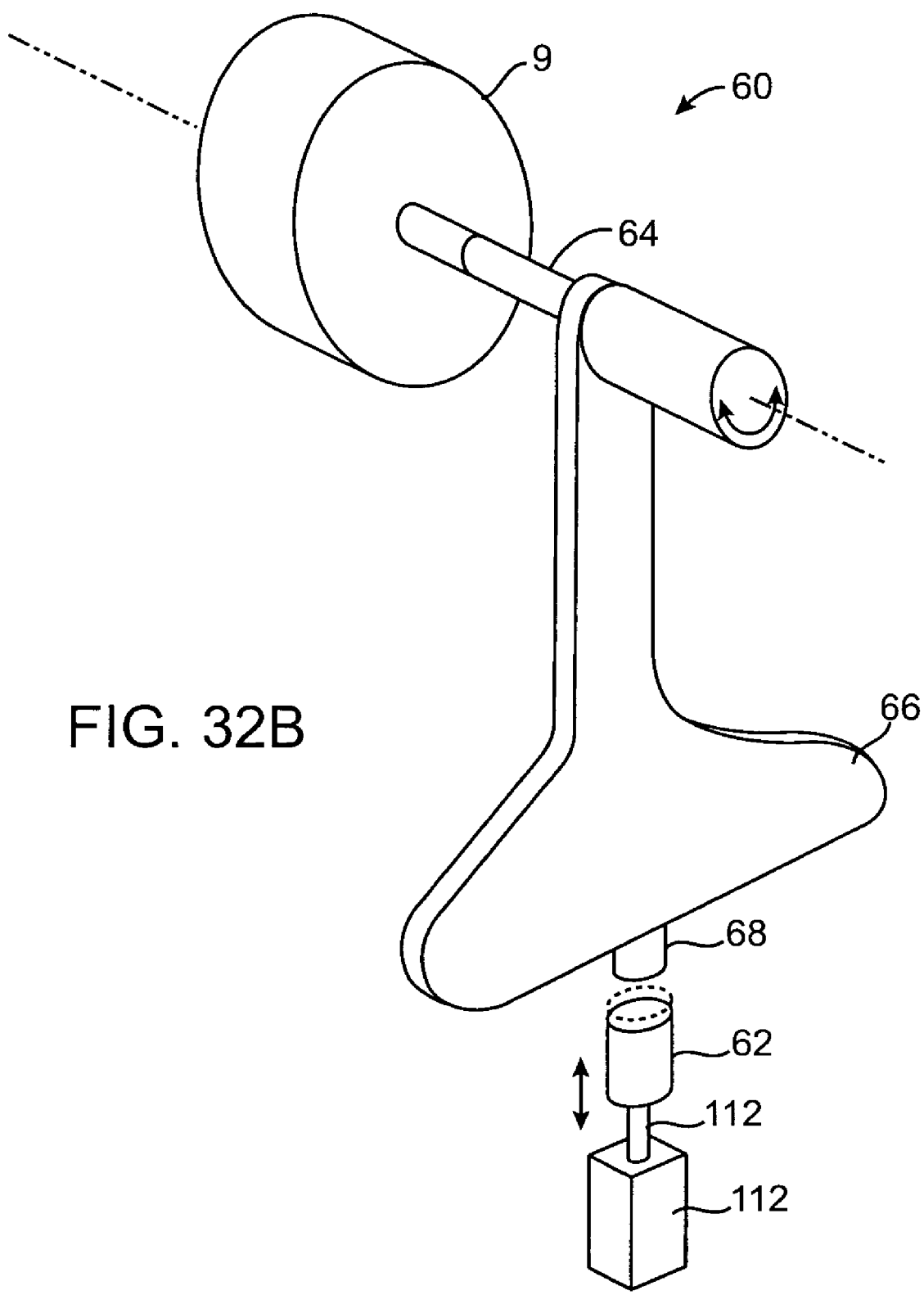
FIGS. 32B and 32C are additional configurations for the magnetically damped inclinometer.
Figure 32C:
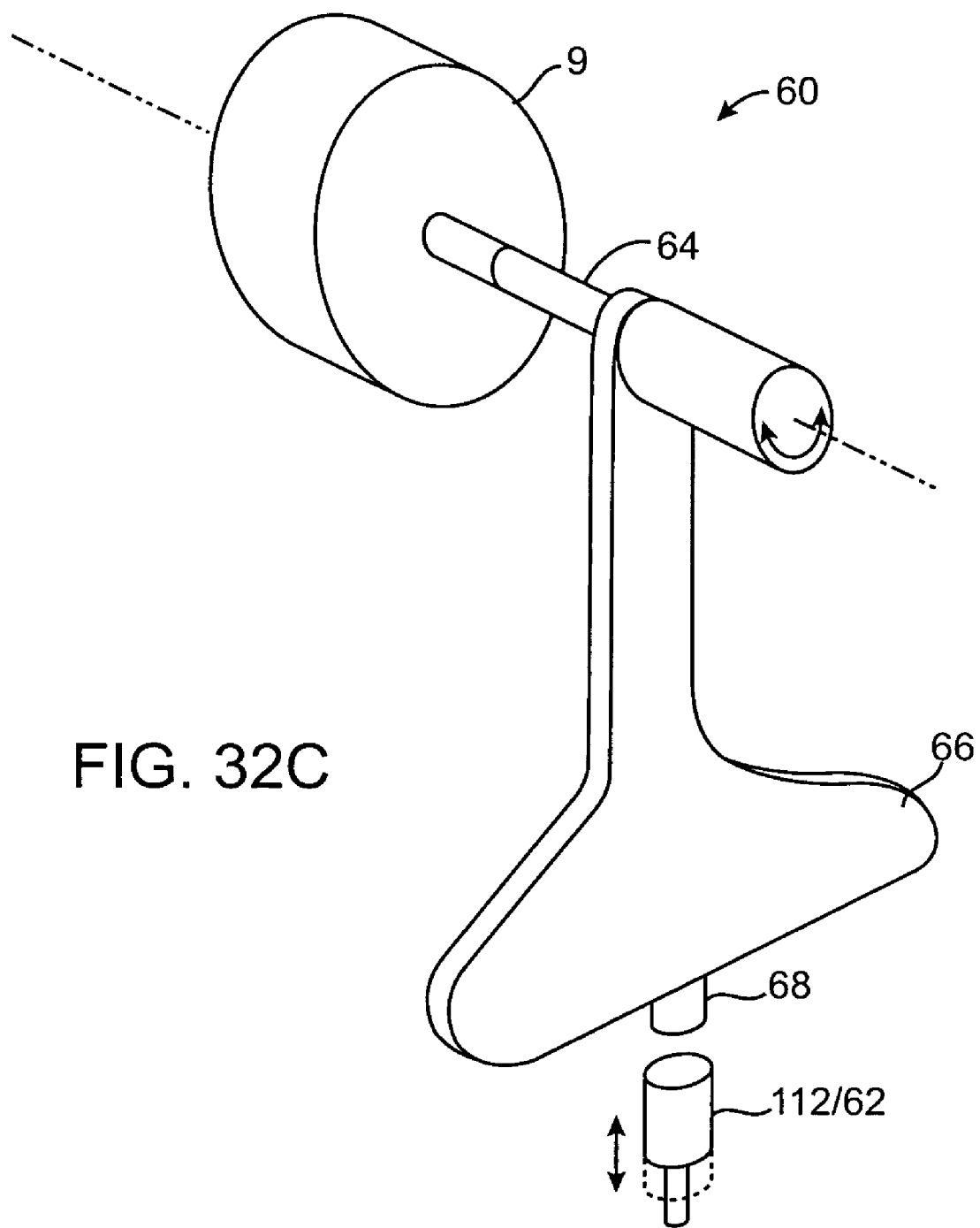

FIG. 32B shows a configuration where the index member 68 is mounted to the end of the pendulum 66. The electromagnet 62 is connected with the actuator 112. In FIG. 32C, the electromagnet and actuator or integrated into a single unit. For example, this may be done by using as solenoid as the actuator 112, thereby using a single magnetic field to act as the electromagnet and interact with the index member 68 and the actuator. Alternately, selectively powering the electromagnet may be used in place of the actuator.

FIG. 33 is a perspective view of the magnetically damped inclinometer 60 of FIG. 32A having a proximity void 70 located in the shaft 64. A proximity sensor 72 is located above the void 70. In alternate embodiments, a projection or other object and sensor could perform the same function. The proximity sensor 72 is attached to the load or object and provides information to the system regarding the orientation of the pendulum 66. The sensor 72 and void 70 combination may be used for several purposes, including, but not limited to, calibration or recalibration of the system, diagnostics for troubleshooting problems with the system, measurements for test systems during research on pendulum motion.

Figure 34:
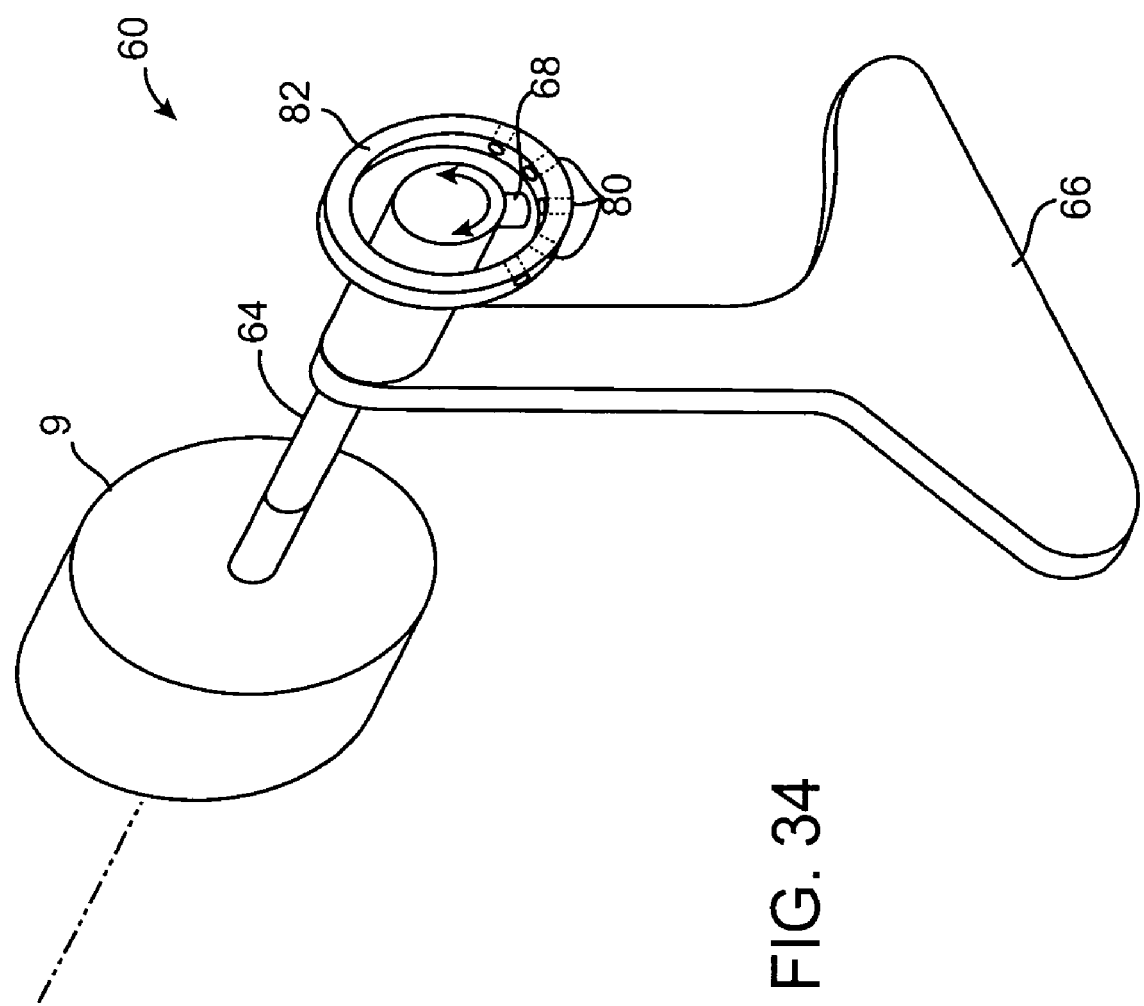
FIG. 34 is a perspective view of a magnetically damped inclinometer 60 using a plurality of permanent magnets.

FIG. 34 is a perspective view of a magnetically damped inclinometer 60 using a plurality of permanent magnets. Similar to the inclinometer of FIG. 32A, the inclinometer 60 shown has a rotating shaft 64 with a pendulum 66 and ferrous index member 68 attached thereto. In this embodiment, permanent magnets 80 are mounted in or on a ring 82. The center of ring 82 is off center from the axis of the shaft 64, such that as the pendulum 66 rotates the shaft 64 from its initial position, the air gap between the index member and any corresponding magnet 80 on the ring 82 increases. Since the force from the magnet 80 decreases as the air gap increases, the extent of the swing is not significantly reduced, but any excess motion is reduced. This damping action takes place as the pendulum 66 moves along each swing motion.

Figure 35:
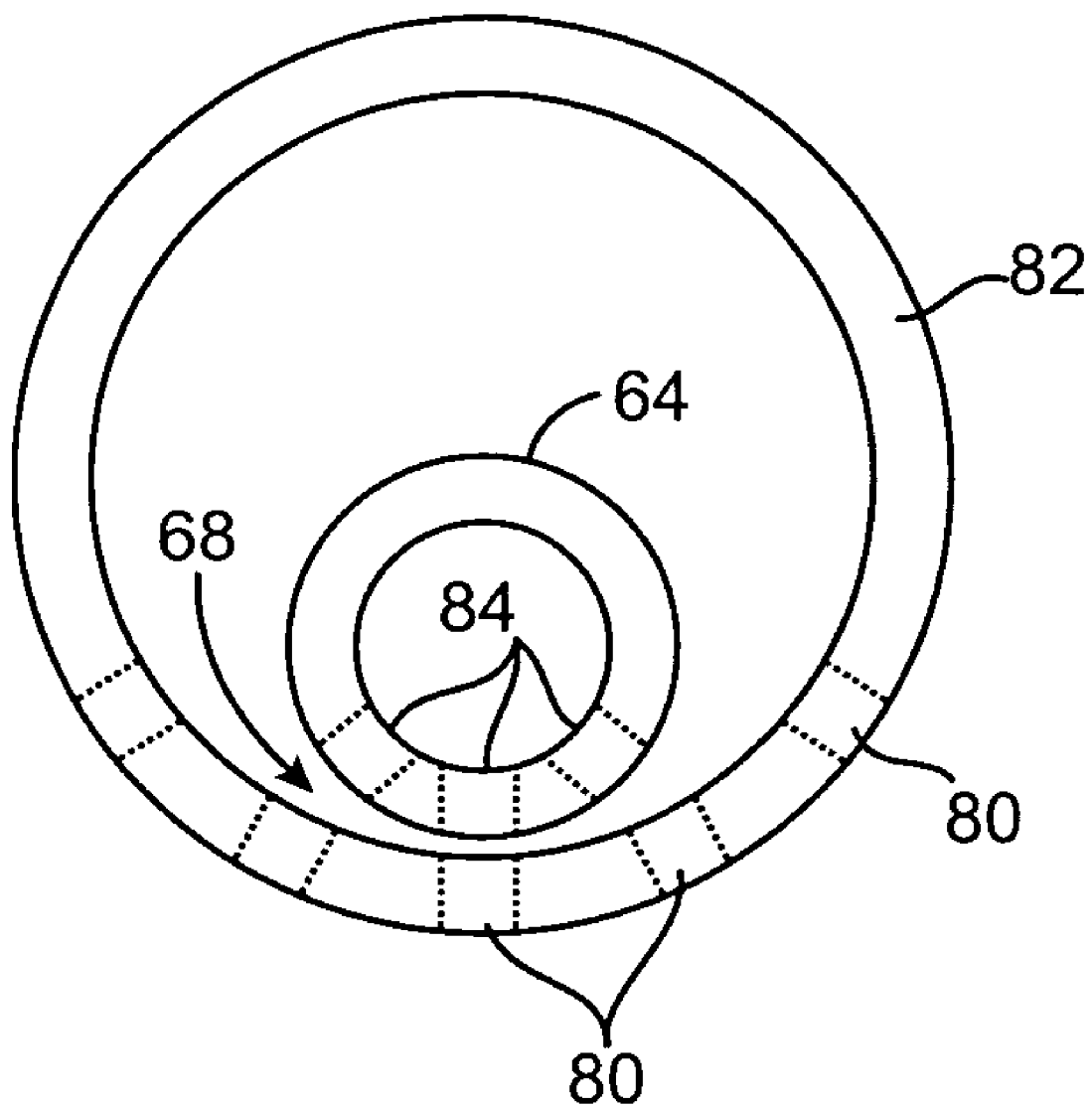
FIG. 35 is a detail view of an alternate configuration of the magnets in the inclinometer of FIG. 34.

FIG. 35 is a detail view of an alternate configuration of the magnets in the inclinometer of FIG. 34. In this embodiment, the index member 68 takes the form of a plurality of permanent ferrous or non-ferrous magnets 84 attached around the perimeter of the shaft 64.

Figure 36:
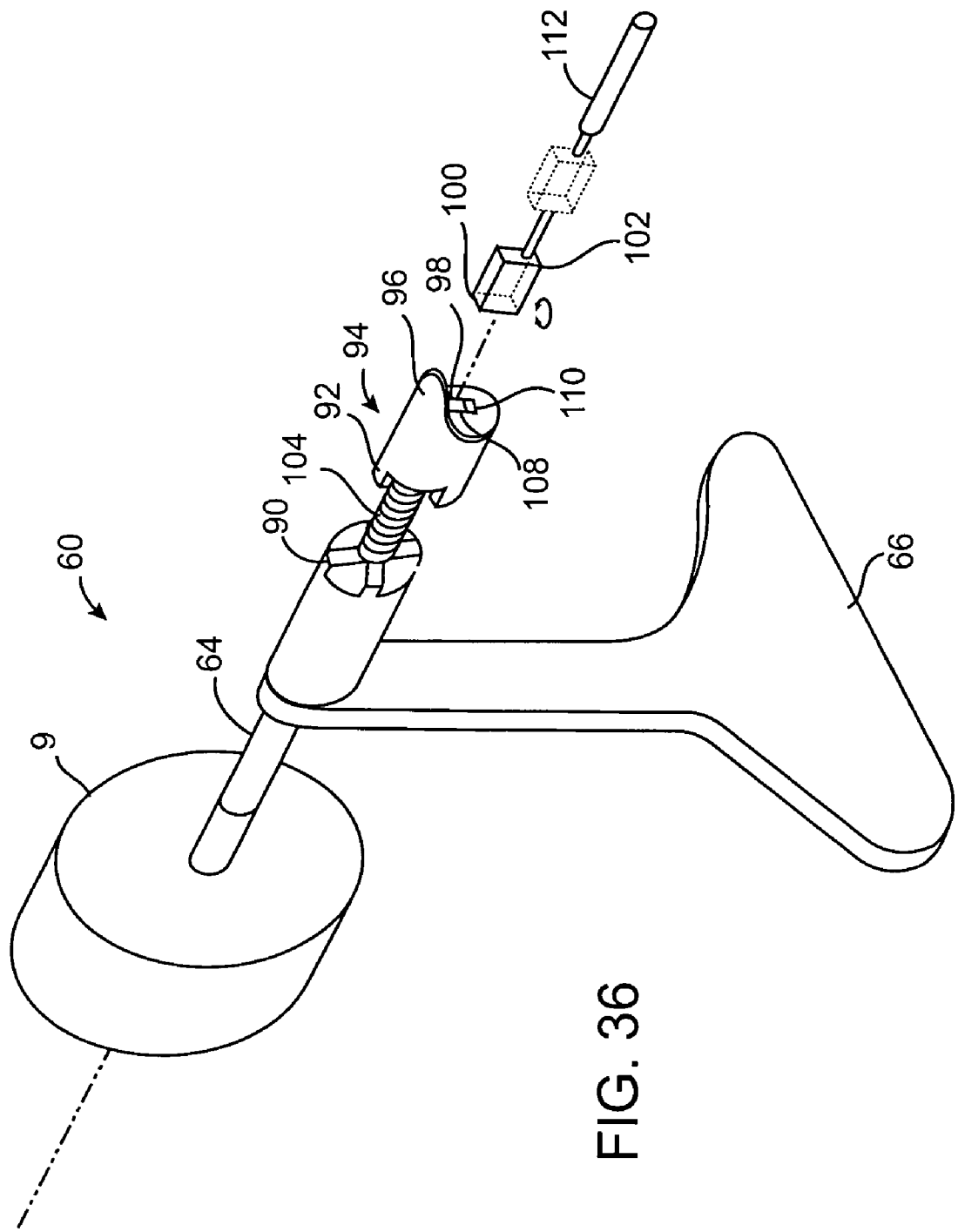
FIG. 36 is a perspective view of a magnetically damped inclinometer having a spring-loaded cam.

FIG. 36 is a perspective view of a magnetically damped inclinometer 60 having a spring-loaded cam. Similar to the inclinometer of FIG. 32A, the inclinometer 60 shown has a rotating shaft 64 with a pendulum 66. In this embodiment, near one end of the shaft 64 a first magnet or set of magnets 90 fixedly attached thereto. A second magnet or set of magnets 92 is slidably attached to the shaft 64. In the embodiment shown, the second magnet 92 takes the form of several magnets attached to a sliding collar 94 located around the shaft 64. A spring 104 is located between the magnets 90, 92. Any type of spring 104 may be used to push the second magnet(s) 92 away from the first magnet(s) 90. In the embodiment shown, the spring 104 takes the form of a coil spring 104 wound around the shaft 64. The end of the shaft 64 forms a spline 108 that is located within a keyway 110 of the sliding collar 94. The cam 96 has a cam lobe 98 forming a high point. A roller or other rolling member 100 is connected to the object or load. In the embodiment shown, the rolling member 100 rotates around a pin held in a housing 102 attached to the object or load. In the initial position, the roller is located against the high point of the cam lobe 98 and holds the second magnet(s) 92 toward the first magnet(s) 90. As the pendulum 66 rotates the shaft 64, the cam 96 rotates and the cam lobe 98 turns to allow the roller 100 to engage a lower point on the cam 96. As the rotation takes place the spring 104 pushes the second magnet(s) 92 away from the first set of magnet(s) 90. Each swing motion of the pendulum 66 is damped by the magnet attraction between the first and second sets of magnets 90, 92.

Figure 37:
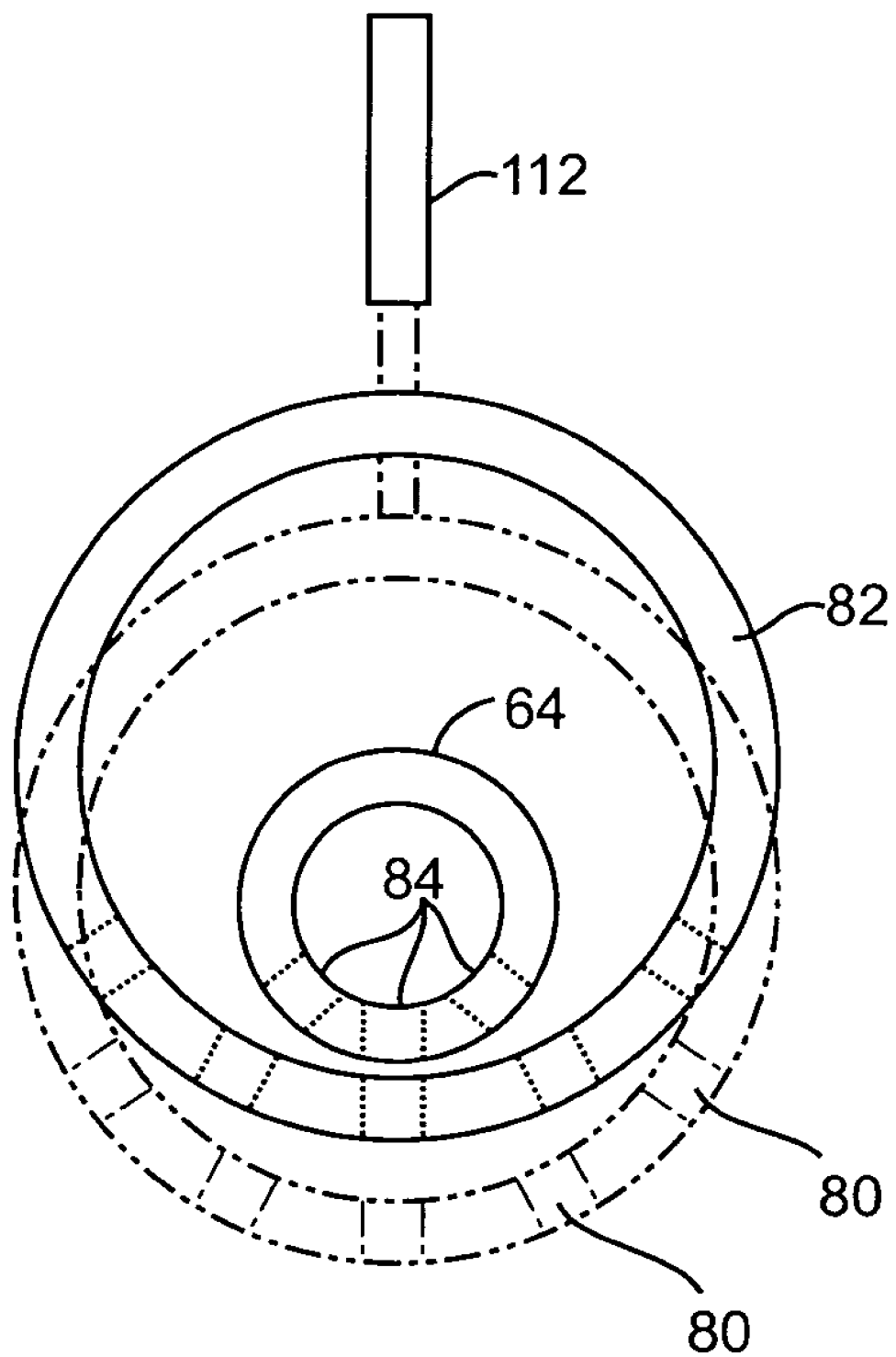
FIG. 37 shows a detail view of an inclinometer having an actuator to change the air gap between the magnetic elements.

Optionally, an actuator 112 may be used in any of the inclinometers 60 shown to increase and decrease the air gap between the magnets or electromagnets. The actuator 112 could take the form of a solenoid, linear actuator or other mechanism to move the magnets closer or farther apart. In the system 60 shown in FIG. 36, rolling member 100 is connected to the actuator 112. The actuator 112 moves the rolling member 100 and correspondingly the range of motion of the sliding collar 94. Typically, the gap would be increased to maximize the sensitivity during the initial pendulum motion, thereby creating the most accurate measurement. When the pendulum swings back, the actuator 112 would decrease the air gap, thereby maximizing the damping of the inclinometer. FIG. 37 shows an actuator 112, used with an inclinometer 60 using a set of magnets 80 mounted on a ring, as shown in FIG. 35. In this case, the actuator 112, moves the ring 82 such that the magnets 80 or ferromagnetic material on the ring 82 are close to the magnet(s) 84 or ferromagnetic material mounted on the shaft 64, as seen in solid lines, or farther away from the magnet(s) 84, electromagnet, or ferromagnetic material mounted on the shaft 64, as seen in phantom lines. If an electromagnet were used, the electromagnet could be turned off during the initial swing and turned on during the return swing.

These inclinometers 60 may be used to measure the angle of the spreader bar to enable the system to use a single stage response to cancel unwanted sway motion without calculations. This creates a system that is faster, more accurate and more reliable than prior art systems.

The apparatus and methods of the present invention are also readily adaptable to a container crane of the type having a carriage movable along two or more axes. The pendulum swing measuring apparatus may be adapted for measuring load sway of the container along both axes and the method may be modified for cancellation of pendulum swing motion along one or the other of the axes or both simultaneously. The apparatus of FIG. 19 is particularly applicable to the type of container cranes having a carriage movable along two or more axes because the moving beams of such cranes have very high inertia, which makes it more difficult to perform the pendulum motion cancellation protocol. A secondary carriage of lower inertia movable in two axes relative to the primary carriage greatly facilitates the operation of the pendulum motion cancellation protocol.

While the present invention has been described herein with respect to the exemplary embodiments and the best mode for practicing the invention, it will be apparent to one of ordinary skill in the art that many modifications, improvements and subcombinations of the various embodiments, adaptations and variations can be made to the invention without departing from the spirit and scope thereof.

What is claimed is:

1. A magnetically damped inclinometer and controller for determining and controlling the sway of an object in relation to a support surface, comprising:
    an inclinometer including:
        a housing fixable to the object,
        a rotatable shaft extending from said housing,
        a pendulum fixedly mounted to said shaft,
        an index member formed of magnetic material and attached to said shaft,
        and a magnet attachable to the object,
    and a controller for controlling horizontal movement of the object, the controller performing a pendulum motion cancellation protocol in response to a feedback signal from said inclinometer,
    wherein the pendulum motion cancellation protocol utilizes a controlled horizontal movement of the object for cancellation of a measured pendulum swing of the object, thereby inhibiting an oscillation pattern from being established in the object.

2. The damped inclinometer of claim 1, wherein said magnet is an electromagnet.

3. The damped inclinometer of claim 1, wherein said magnet is a permanent magnet.

4. The damped inclinometer of claim 1, wherein said index member is formed of a ferrous material.

5. The damped inclinometer of claim 1, wherein said index member is formed of a plurality of members located around a perimeter of said shaft.

6. The damped inclinometer of claim 5, wherein said index members are permanent magnets.

7. The damped inclinometer of claim 1, wherein said magnet is a plurality of permanent magnets mounted on a ring attachable to the object and located around said index member.

8. The damped inclinometer of claim 7, wherein said ring is not concentric with said shaft, thereby creating a increasing air gap between said ring and said index member as said pendulum rotates said shaft away from an initial position.

9. The damped inclinometer of claim 1, further comprising:
    a proximity void located in said shaft,
    and a proximity sensor attachable to the object and located proximate said proximity void.

10. The damped inclinometer of claim 1, used in combination with the object, and wherein the object is a spreader bar supporting a container load and the support surface is a carriage of a crane.

11. The damped inclinometer of claim 1, wherein said pendulum is rigid.

12. A method of using the damped inclinometer of claim 1 to measure and control pendulum motion of a load suspended from a carriage of a container crane of the type wherein the carriage is configured for horizontal movement along an axis, the method comprising the steps of:
    moving the carriage horizontally along the axis;
    measuring a pendulum swing of the load suspended from the carriage using the inclinometer of claim 1 to produce a feedback signal indicative of the pendulum swing angle of the load; and
    performing a pendulum motion cancellation protocol in response to the feedback signal from the inclinometer.

13. The method of claim 12, wherein the inclinometer is magnetically damped, the damping comprising:
    passing an index member formed of a ferromagnetic material attached to a rotatable shaft past a magnet.

14. The method of claim 12, wherein the pendulum motion cancellation protocol comprises decelerating the carriage while measuring a counterswing of the load, accelerating the carriage to counteract the counterswing, then decelerating the carriage to a stop over a target location.

15. The method of claim 12, wherein the pendulum motion cancellation protocol comprises decelerating the carriage to a stop at an intermediate position, measuring a counterswing of the load, accelerating the carriage to counteract the counterswing, then decelerating the carriage to a stop over a target location.

16. The method of claim 12, wherein the step of moving the carriage horizontally comprises moving the carriage along a horizontal rail of the container crane.

17. The method of claim 12, wherein the pendulum motion cancellation protocol comprises decelerating the carriage to a stop, measuring a counterswing of the load accelerating a secondary carriage movably mounted to the carriage to counteract the counterswing, then decelerating the secondary carriage to a stop over a target location.

18. A method of using a damped inclinometer, the method comprising the steps of:
    providing a damped inclinometer, including:
        a housing fixable to a load,
        a rotatable shaft extending from said housing,
        a pendulum fixedly mounted to said shaft,
        an index member formed of a magnetic material and attached to said shaft,
        and a magnet attachable to the load;
    moving a carriage horizontally along the axis;
    measuring a pendulum swing of the load suspended from the carriage using the inclinometer to produce a feedback signal indicative of the pendulum swing angle of the load; and
    performing a pendulum motion cancellation protocol in response to the feedback signal from the inclinometer, wherein the pendulum motion cancellation protocol utilizes a controlled horizontal movement of the carriage for cancellation of a measured pendulum swing of the load, thereby inhibiting an oscillation pattern from being established in the load.

19. The method of claim 18, wherein the inclinometer is magnetically damped, the damping comprising:
    passing an index member formed of a ferromagnetic material attached to a rotatable shaft past a magnet.

20. The method of claim 18, wherein the pendulum motion cancellation protocol comprises decelerating the carriage while measuring a counterswing of the load, accelerating the carriage to counteract the counterswing, then decelerating the carriage to a stop over a target location.

21. The method of claim 18, wherein the pendulum motion cancellation protocol comprises decelerating the carriage to a stop at an intermediate position, measuring a counterswing of the load, accelerating the carriage to counteract the counterswing, then decelerating the carriage to a stop over a target location.

22. The method of claim 18, wherein the step of moving the carriage horizontally comprises moving a carriage along a horizontal rail of a container crane.

23. The method of claim 18, wherein the pendulum motion cancellation protocol comprises decelerating the carriage to a stop, measuring a counterswing of the load accelerating a secondary carriage movably mounted to the carriage to counteract the counterswing, then decelerating the secondary carriage to a stop over a target location.

* * * * *